United States Patent
Barreiro

(10) Patent No.: US 6,769,323 B2
(45) Date of Patent: Aug. 3, 2004

(54) SPRING MOTOR FOR GENERATING ELECTRICAL ENERGY

(75) Inventor: Manuel Vieira Barreiro, Ellenbrook (AU)

(73) Assignee: Barreiro Motor Company PTY Ltd., Perth (AU)

( * ) Notice: Subject to any disclaimer, the term of this patent is extended or adjusted under 35 U.S.C. 154(b) by 115 days.

(21) Appl. No.: 10/167,935

(22) Filed: Jun. 10, 2002

(65) Prior Publication Data

US 2002/0178847 A1 Dec. 5, 2002

Related U.S. Application Data

(63) Continuation-in-part of application No. PCT/AU00/01185, filed on Sep. 28, 2000.

(30) Foreign Application Priority Data

Dec. 10, 1999 (AU) ............................................. PQ4601
Dec. 17, 1999 (AU) ............................................. PQ4700
Mar. 10, 2000 (AU) ............................................. PQ6114

(51) Int. Cl.[7] ............................................. F16H 27/02
(52) U.S. Cl. ............................. 74/129; 74/126; 74/128
(58) Field of Search ......................... 74/129, 126, 128

(56) References Cited

U.S. PATENT DOCUMENTS 3,756,590 A * 9/1973 Martin ........................ 271/266
4,265,128 A * 5/1981 Ohshima ..................... 74/10.15
4,711,139 A * 12/1987 Desousa ........................ 74/837

FOREIGN PATENT DOCUMENTS

| DE | 527 501 | 6/1931 |
| DE | 29 06 563 | 8/1980 |
| WO | WO 96/27083 | 9/1996 |

* cited by examiner

*Primary Examiner*—David Fenstermacher
(74) *Attorney, Agent, or Firm*—Merchant & Gould P.C.

(57) ABSTRACT

An engine (10) which can deliver mechanical work for an extended duration in comparison to the duration of energy input into the engine. The engine (10) includes a drive shaft (11) through which it delivers mechanical work. The drive shaft (11) is drivingly connected to an electrodynamic machine (13) for generating electrical energy. The drive shaft (11) is driven by a drive system (15) which incorporates various drive mechanisms (16), power means (17) for operating the drive mechanisms (16) and gearing (18) for drivingly connecting the drive mechanisms (16) to the drive shaft (11). The various drive mechanisms (16) are operated in a pre-determined sequence by the power means (17). Each drive mechanism (16) is in the form of a rack and pinion mechanism. The power means (17) for operating the drive mechanisms (16) comprises spring structure (130) associated with each rack of the rack and pinion mechanisms. The power means (17) also comprises a hydraulic ram (135) for loading each of the spring structures (130).

39 Claims, 22 Drawing Sheets

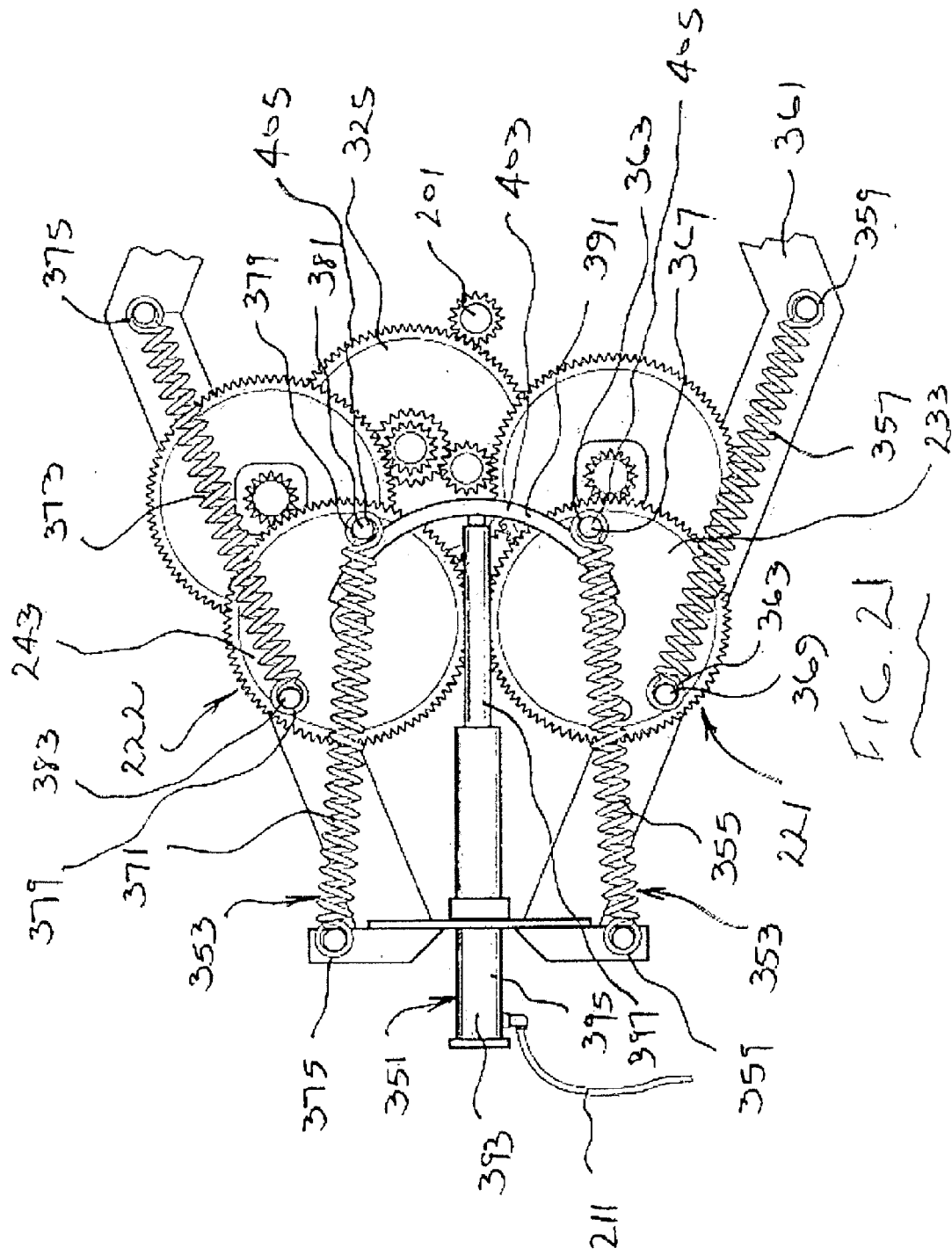

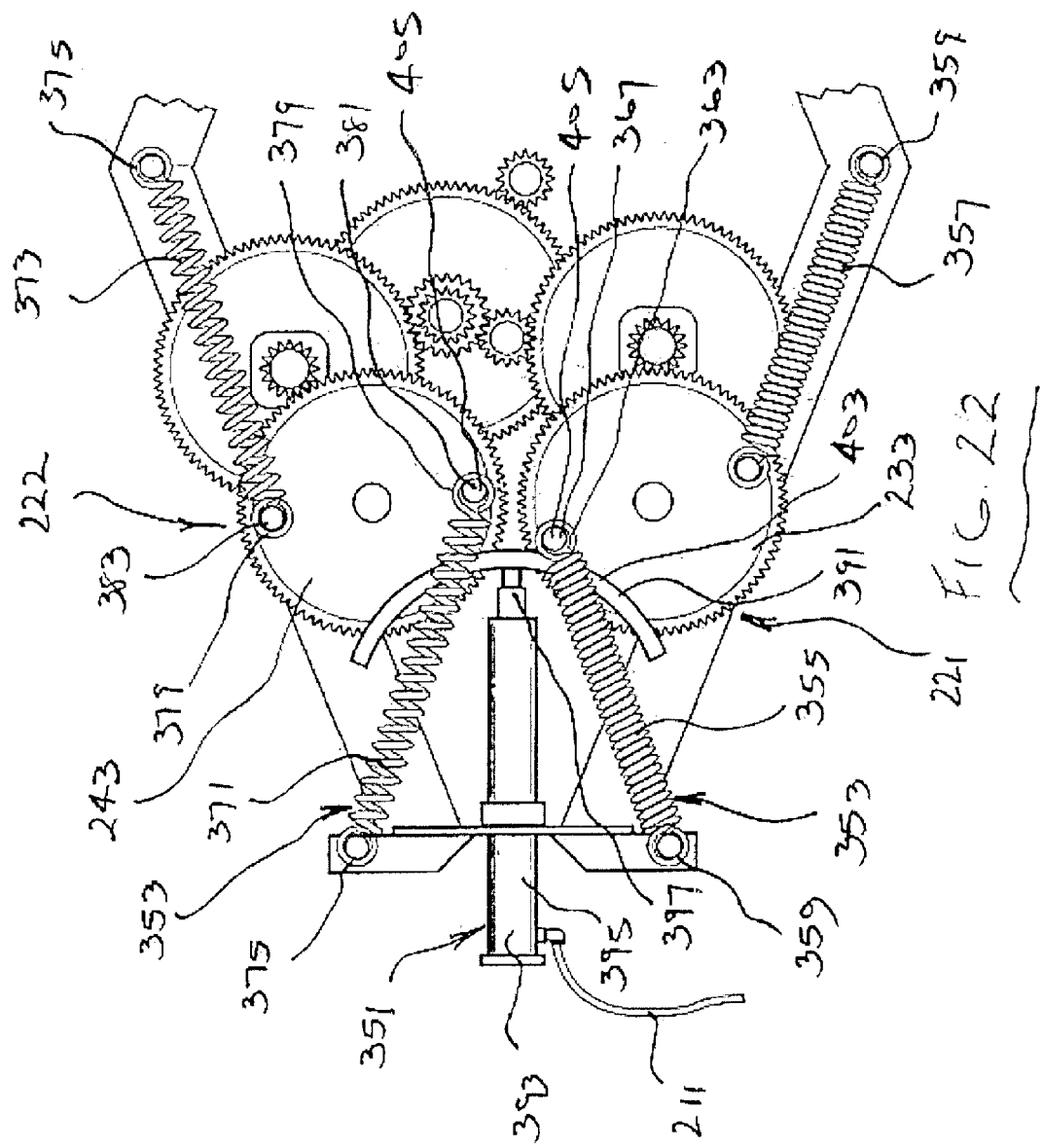

SPRING MOTOR FOR GENERATING ELECTRICAL ENERGY

This application is a continuation-in-part of international application number PCT/AU00/01185, filed Sep. 28, 2000.

FIELD OF THE INVENTION

This invention relates to a machine capable of sustained delivery of mechanical energy with intermittent energy input. The invention also relates to a method of operation of such a machine.

The machine operates as an engine for delivery of mechanical work for an extended duration in comparison to the duration of energy input into the engine.

BACKGROUND ART

With a typical engine, input energy is delivered to the engine in a substantially constant manner for conversion into output energy (in the form of mechanical work). By way of example, in the operation of an electric motor, input electrical energy is delivered continuously to the motor for conversion into output energy in the form of mechanical work.

There are circumstances where it is desirable to have an engine which can provide a sustained energy output with only intermittent energy input. One such circumstance is where an engine is required to drive an electrodynamic machine for producing electrical power at a location where a reticulated power supply is unavailable. Some of the electrical power so produced can be utilised to operate the source providing the intermittent input energy.

DISCLOSURE OF THE INVENTION

The present invention provides a machine comprising:
a drive shaft;
a first gear train and a second gear train both drivingly connected to the drive shaft;
the first gear train having a first input shaft;
the second gear train having a second input shaft;
a first drive mechanism drivingly connected to the first input shaft;
a second drive mechanism drivingly connected to the second input shaft; and
a power means for operating the first and second drive mechanisms to sequentially move through power and return strokes whereby upon each power stroke the drive mechanisms respectively apply torque to the first and second input shafts.

Preferably, the sequence in which torque is applied to the first and second input shafts is such that torque is initially delivered to both the first and second input shafts and subsequently to only one of the input shafts. This is achieved by one drive mechanism completing its power stroke after completion of the power stroke by the other drive mechanism. Conveniently, said one drive mechanism has completed about one-half of its power stroke at the stage where the other completes its power stroke.

The transmission ratio between the first drive mechanism and the drive shaft, and the transmission ratio between the second drive mechanism and the drive shaft, can each be selected according to the particular application of the engine.

The first and second gear trains may share some common gears.

In one arrangement, the first drive mechanism may comprise a first rack and pinion mechanism. With this arrangement, the pinion of the first rack and pinion mechanism is drivingly connected to the first input shaft.

Further, the second drive mechanism may comprise a second rack and pinion mechanism. With this arrangement, the pinion of the second rack and pinion mechanism is drivingly connected to the second input shaft.

The power means may comprise a spring structure associated with each rack and loading means for loading the spring structure to generate a spring force therein, wherein the spring force is utilised to drive the rack in one direction to provide the power stroke for effecting rotation of the respective pinion.

Preferably, the pinions are adapted to freewheel with respect to their respective input shafts upon movement of the racks in the reverse direction (being the return stroke). The freewheeling action of each pinion with respect to its input shaft may be provided by a clutch mechanism operating between the pinion and the input shaft.

The first and second racks preferably undergo their return strokes in unison.

The spring structure may be of the type which is loaded in tension or of the type which is loaded in compression.

The spring structure may be in any appropriate form, such as, for example, a mechanical spring, a pneumatic spring, a body of elastic material such as rubber, or any combination thereof. Where a mechanical spring is utilised, it can be of any suitable type, such as a helical spring or a coil spring.

The loading means for loading the spring structure may comprise a power mechanism including a telescopic ram, whereby operation of the ram effects rapid loading of the spring structure. Conveniently, the ram comprises a hydraulic ram. The hydraulic ram is preferably included in a hydraulic circuit which further includes a hydraulic pump driven by an electric motor. The electric motor may be powered from an electrical supply generated by an electrodynamic machine driven by the engine.

The machine may further comprise
a third gear train and a fourth gear train both drivingly connected to the drive shaft;
the third gear train having a third input shaft;
the fourth gear train having a fourth input shaft;
a third drive mechanism drivingly connected to the third input shaft;
a fourth drive mechanism drivingly connected to the fourth input shaft,
wherein the power means drives the third and fourth drive mechanisms to sequentially move the third and fourth through power and return strokes whereby upon each power stroke the third and fourth drive mechanisms apply torque to the third and fourth input shafts.

The various drive mechanisms are preferably arranged to operate in a pre-determined sequence.

Preferably, the pre-determined sequence is such that torque is initially delivered to both the first and second input shafts and subsequently to only first input shaft during which stage torque is initially delivered to both the third and fourth input shafts and subsequently to only the third input shaft during which stage torque is initially delivered to both the first and second input shafts and subsequently to only the first input shaft.

The third and fourth gear trains may share some common gears with each other and may also share some common gears with the first and second gear trains.

In an alternative arrangement, each drive mechanism may comprise a gear and pinion mechanism.

With such an arrangement, the power means may comprise a spring structure associated with each gear and a loading means for loading the spring structure to generate a spring force therein.

The spring structure may comprise at least one, and preferably two or more, axial springs (such as extension springs or compression springs) each having one end attached to the respective gear and the other end fixed, whereby rotation of the gear in one direction corresponds to extension of the spring and rotation of the gear in the other direction corresponds to contraction of the spring.

Conveniently, each spring is an extension spring in which case rotation of the gear in one direction causes extension of the spring to effect loading thereof such that the spring force so generated subsequently effects reverse rotation of the gear upon contraction of the spring.

With such an arrangement, the drive mechanism performs a loading (return) stroke upon rotation of the gear in the direction corresponding to loading of the spring and a power stroke when moving in the reverse direction under the influence of the spring.

The loading means may be common to both the first and second drive mechanisms.

The loading means may comprise a movable element operably connected to the gears of the two gear and pinion mechanisms whereby linear movement of the movable element in one direction causes rotation of the gears and thus loading of the respective springs connected thereto.

The movable element may provide a cam having an arcuate cam profile, and each gear may have a crank element engagable with the cam profile for movement therealong upon linear movement of the movable element in said one direction.

The movable element may comprise an arcuate rail which in effect provides the cam for driving the cranks of the two gears. The arcuate rail may be of channel cross-section and each crank may incorporate a roller received in the channel for rolling movement therealong.

The loading means may further comprise a power mechanism for effecting linear movement of the movable element in said one direction. The power mechanism may comprise a telescopic ram such as a hydraulic ram.

Conveniently, the movable element can undergo reverse movement under the influence of at least one of the gears as the latter rotates to perform its power stroke.

The first drive mechanism is drivingly connected to the drive shaft by way of a first gear train, and the second drive mechanism is drivingly connected to the drive shaft by way of a second gear train. The first and second gear trains may share some common gears.

The pinion of each gear and pinion mechanism is adapted to freewheel as its respective gear undergoes a loading (return) stroke.

The transmission ratio between the first drive mechanism and the drive shaft, and the transmission ratio between the second drive mechanism and the drive shaft, can each be selected according to the particular application of the engine. However, the arrangement is such that the two drive mechanisms perform their loading (return) strokes in unison under the influence of the common power means, and perform their respective power strokes at different rates, with one drive mechanism completing its power stroke after completion of the power stroke of the other drive mechanism.

The present invention also provides a machine comprising:
 a drive shaft;
 a first gear train and a second gear train both drivingly connected to the drive shaft;
 the first gear train having a first input shaft;
 the second gear train having a second input shaft;
 a first drive mechanism drivingly connected to the first input shaft;
 a second drive mechanism drivingly connected to the second input shaft;
 each drive mechanism comprising a gear and pinion mechanism;
 a power means for operating the first and second drive mechanisms to sequentially move through power and return strokes whereby upon each power stroke the drive mechanisms respectively apply torque to the first and second input shafts; and
 the power means comprising a spring structure associated with the gear of each gear and pinion mechanism, and a loading means common to both drive mechanisms for loading the spring structures to generate spring forces therein.

The present invention also provides a machine comprising a drive shaft, and first, second, third and fourth drive mechanisms drivingly connected to the drive shaft for applying rotational torque thereto during power strokes of the drive mechanisms, the drive mechanisms being operable to perform their respective power strokes in a cycle whereby the first and second drive mechanisms operate together during part of their power strokes and thereafter the second drive mechanism completes its power stroke while the first drive mechanism continues its power stroke during which stage the third and fourth drive mechanisms operate together during part of their power strokes and thereafter the fourth drive mechanism completes its power stroke while the third drive mechanism continues its power stroke during which stage the first and second drive mechanisms operate together during part of their power strokes to repeat the cycle.

The invention also provides a method of operating a machine having a drive shaft, and first and second drive mechanisms operatively connected to the drive shaft for applying rotational torque thereto during power strokes of the drive mechanism, the method comprising the steps of operating the machine in an operating cycle in which both drive mechanisms operate together during part of their power strokes and thereafter one drive mechanism completes its power stroke while the other drive mechanism continues its power stroke, and following completion of the power stroke of said other drive mechanism both drive mechanisms operate together during part of their power strokes to repeat the cycle.

The invention also provides a method of operating a machine having a drive shaft, and first, second, third and fourth drive mechanisms operatively connected to the drive shaft for applying rotational torque thereto during power strokes of the drive mechanisms, the method comprising the steps of operating the machine in an operating cycle in which the first and second drive mechanisms operate together during part of their power strokes and thereafter the second drive mechanism completes its power stroke while the first drive mechanism continues its power stroke during which stage the third and fourth drive mechanisms operate together during part of their power strokes and thereafter the fourth drive mechanism completes its power stroke while the third drive mechanism continues its power stroke during which stage the first and second drive mechanisms operate together during part of their power strokes to repeat the cycle.

BRIEF DESCRIPTION OF THE DRAWINGS

The invention will be better understood by reference to the following description of several specific embodiments thereof, as shown in the accompanying drawings in which:

FIG. 21 is a fragmentary side elevational view of the engine, showing in particular two drive mechanisms and an associated spring structure and loading means; and FIGS. 21 and 22 are views similar to FIG. 20 showing the spring structure and loading means at various operational positions.

BEST MODE(S) FOR CARRYING OUT THE INVENTION

Figure 1:
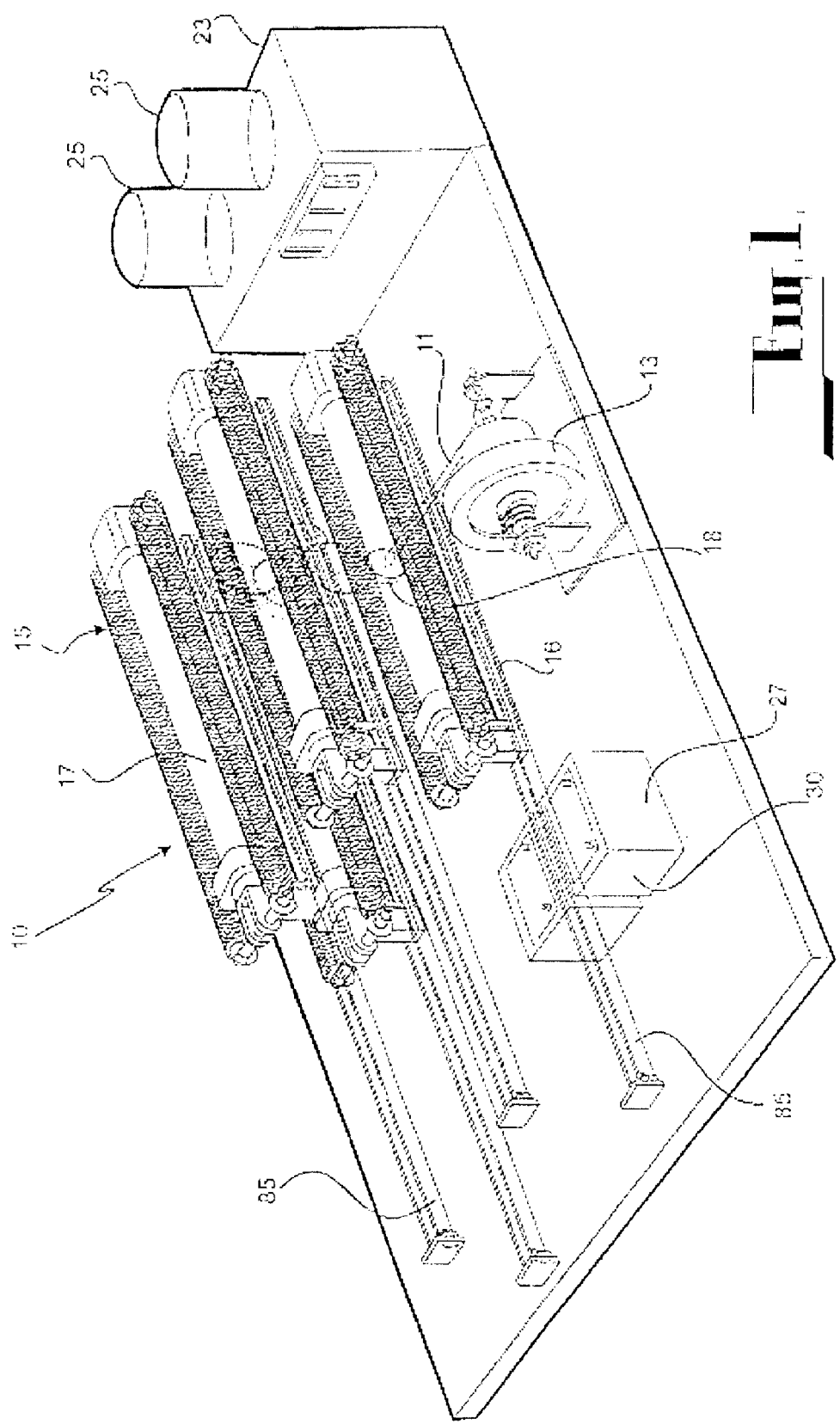
FIG. 1 is a schematic perspective view of an engine according to a first embodiment.

The first embodiment, which is shown in FIGS. 1 to 11 of the accompanying drawings, is directed to an engine 10 which can deliver mechanical work for an extended duration in comparison to the duration of energy input into the engine. The engine 10 includes a drive shaft 11 through which it delivers mechanical work. In this embodiment, the drive shaft 11 is shown drivingly connected to an electro-dynamic machine 13 for generating electrical energy, some of which is used to operate the engine 10 as will be explained in more detail later. The electrodynamic machine 13 may be of the type disclosed in international application PCT/AU00/00778, the contents of which are incorporated herein by way of reference.

The drive shaft 11 is driven by a drive system 15 which incorporates various drive mechanisms 16, power means 17 for operating the drive mechanisms 16, and gearing 18 for drivingly connecting the drive mechanisms 16 to the drive shaft 11.

The engine 10 further comprises a hydraulic circuit which incorporates a reservoir 23 to contain a supply of hydraulic fluid and electrically operable hydraulic pumps 25 for pumping the hydraulic fluid through the hydraulic circuit. The hydraulic pumps 25 receive electrical energy for their operation from an electrical supply 27. The electrical supply 27 in this embodiment comprises an electrical storage means in the form of batteries 30 which are continuously charged using electricity generated by the electrodynamic machine 13. Surplus electricity generated by the electro-dynamic machine 13 can be used for other purposes such as lighting or powering electrical equipment.

The various drive mechanisms 16 comprise a first drive mechanism 31, a second drive mechanism 32, a third drive mechanism 33 and a fourth drive mechanism 34.

The first drive mechanism 31 is in the form of a first rack and pinion mechanism 35 comprising a first rack 37 and a first pinion 39 in engagement with the rack 37.

The first pinion 39 is mounted onto a first input shaft 41 through a clutch mechanism 43. The clutch mechanism 43 allows torque transmission from the first pinion 39 to the first input shaft 41 upon rotation of the pinion in one direction while allowing the pinion to freewheel on the first input shaft upon rotation of the pinion in the reverse direction so as not to transmit torque thereto.

The second drive mechanism 32 is in the form of a second rack and pinion mechanism 45 comprising a second rack 47 and a second pinion 49 in engagement with the second rack 47. The second pinion 49 is mounted onto a second input shaft 51 through a clutch mechanism 53. The clutch mechanism 53 allows torque transmission from the second pinion 49 to the second input shaft 51 upon rotation of the pinion in one direction while allowing the pinion to freewheel on the second input shaft upon rotation of the pinion in the reverse direction so as not to transmit torque thereto.

The third drive mechanism 33 is in the form of a third rack and pinion mechanism 55 comprising a third rack 57 and a third pinion 59 in engagement with the third rack 57. The third pinion 59 is mounted onto a third input shaft 61 through a clutch mechanism 63. The clutch mechanism 63 allows torque transmission from the third pinion 59 to the third input shaft 61 upon rotation of the pinion in one direction while allowing the pinion to freewheel on the third input shaft upon rotation of the pinion in the reverse direction so as not to transmit torque thereto.

The fourth drive mechanism 34 is in the form of a first rack and pinion mechanism 65 comprising a fourth rack 67 and a fourth pinion 69 in engagement with the fourth rack 67. The fourth pinion 69 is mounted onto a fourth input shaft 71 through a clutch mechanism 73. The clutch mechanism 73 allows torque transmission from the fourth pinion 69 to the fourth input shaft 71 upon rotation of the pinion in one direction while allowing the pinion to freewheel on the fourth input shaft upon rotation of the pinion in the reverse direction so as not to transmit torque thereto.

Each rack 37, 47, 57 and 67 comprises a rigid rack bar 81 having rack teeth 83 along one face thereof. The rigid rack bar 81 is guidingly supported for axial movement in a guide structure 85.

The first input shaft 41 and the third input shaft 61 are defined by a common shaft 91 on which a drive gear 93 is rigidly mounted. With this arrangement, the drive gear 93 is caused to rotate upon rotation of the first input shaft 41 and is also caused to rotate upon rotation of the third input shaft 61. The drive gear 93 is in meshing engagement with a driven pinion 95 rigidly mounted on a first lay shaft 97. A drive gear 99 is rigidly mounted on the first lay shaft 97 and is in meshing engagement with a driven pinion 101 rigidly mounted on a second lay shaft 103. A drive gear 105 is rigidly mounted on the second lay shaft 103 and is in meshing engagement with a driven pinion 107 mounted on the drive shaft 11.

A drive gear 111 is rigidly mounted on the second input shaft 51 and is in meshing engagement with the driven pinion 95.

A drive gear 113 is rigidly mounted on the fourth input shaft 71 and is in meshing engagement with a driven pinion 115 rigidly mounted on the first lay shaft 97. The drive gear 111 on the second input shaft 51 and the drive gear 113 on the fourth input shaft 71 have the same number of teeth and the same pitch circle diameter. Similarly, the driven pinions 95 and 115 on the first lay shaft 97 have the same number of teeth and the same pitch circle diameter.

With this arrangement of gearing, each drive mechanism 31, 32, 33 and 34 is drivingly connected to the output shaft 11. More particularly, the first drive mechanism 31 is drivingly connected to the output shaft 11 through a first gear train within the gearing 18, the first gear train providing a first drive path which is depicted by a broken line in FIG. 10 and which is identified by reference numeral 121. Similarly, the second drive mechanism 32 is drivingly connected to the output shaft 11 through a second gear train within the gearing 18, the second gear train providing a second drive path which is depicted by a dotted line in FIG. 10 and which is identified by reference numeral 122. The third drive mechanism 33 is drivingly connected to the output shaft 11 through a third gear train within the gearing 18, the third gear train providing a third drive path which is depicted by a broken line in FIG. 11 and which is identified by reference numeral 123. The fourth drive mechanism 34 is drivingly connected to the output shaft 11 through a fourth gear train within the gearing 18, the fourth gear train providing a fourth drive path which is depicted by a dotted line in FIG. 11 and which is identified by reference numeral 124.

The gearing between the first input shaft 41 and the second input shaft 51 provides a transmission ratio of 1:10. In other words, the second input shaft 51 undergoes ten revolutions for each revolution of the first input shaft 31. Similarly, the gearing between the second input shaft 51 and the drive shaft 11 provides a transmission ratio of 1:10. In other words, the drive shaft 11 undergoes 10 revolutions for each revolution of the second input shaft 51.

The gearing between the third input shaft 61 and the fourth input shaft 71 provides a transmission ratio of 1:10. In other words, the fourth input shaft 71 undergoes 10 revolutions for each revolution of the third input shaft 61. Similarly, the gearing between the fourth input shaft 71 and the drive shaft 11 provides a transmission ratio of 1:10. In other words, the drive shaft 11 undergoes 10 revolutions for each revolution of the fourth input shaft 71.

The power means 17 for operating the drive mechanisms 16 comprises a spring structure 130 associated with each of the racks 37, 47, 57 and 67.

The power means 17 also comprises a power mechanism 133 for loading each of the spring structures 130. The power mechanism 133 comprises a hydraulic ram 135, the cylinder 137 of which is fixed to a supporting structure (not shown). The extensible rod 139 of each hydraulic ram 135 is connected to a mounting lug 141 provided on one end of each rack 37, 47, 57 and 67. With this arrangement, extension of each hydraulic ram 135 causes the respective rack to which it is connected to move axially along the respective guide structure 85.

Each spring structure 130 comprises two helical tension springs 145. One end of each helical spring 145 is connected to a mounting 147 on the cylinder 137 of the respective hydraulic ram 135 and the other end of the spring is connected to a mounting 149 on the rod of the hydraulic ram. With this arrangement, extension of the hydraulic ram 135 causes the springs 145 to correspondingly extend and so be loaded.

The spring force established in the loaded springs 145 subsequently causes the respective rack 37, 47, 57, 67 to move in the other direction, so undergoing a power stroke and driving the respective pinion 39, 49, 59 and 69 with which it is in meshing engagement to thereby apply torque to the respective input shaft 41, 51, 61, 71 on which the pinion is mounted.

The first and second racks 37, 47 do not operate in unison when performing a power stroke but rather in a timed sequence. The sequence is such that the second rack 47 moves at a rate faster than the first rack 37 during the power strokes thereof, the rate of relative movement between the racks being regulated by the gear ratio between each rack and the particular pinion with which it is in meshing engagement. In this embodiment, the relationship is that the second rack 47 moves at about twice the rate of the first rack 37. A similar relationship exists between the third and fourth racks 57, 67; that is, the fourth rack 67 moves at a rate faster than the third rack 57 during the power strokes thereof.

Each hydraulic ram 135 is incorporated in the hydraulic circuit referred to previously and so operates in response to fluid pressure delivered by way of the hydraulic pumps 25. A control system (not shown) is provided for operating the hydraulic rams 135 in a prescribed sequence.

Operation of the engine 10 will now be described with reference to FIGS. 2 to 9 of the accompanying drawings.

Figure 2:
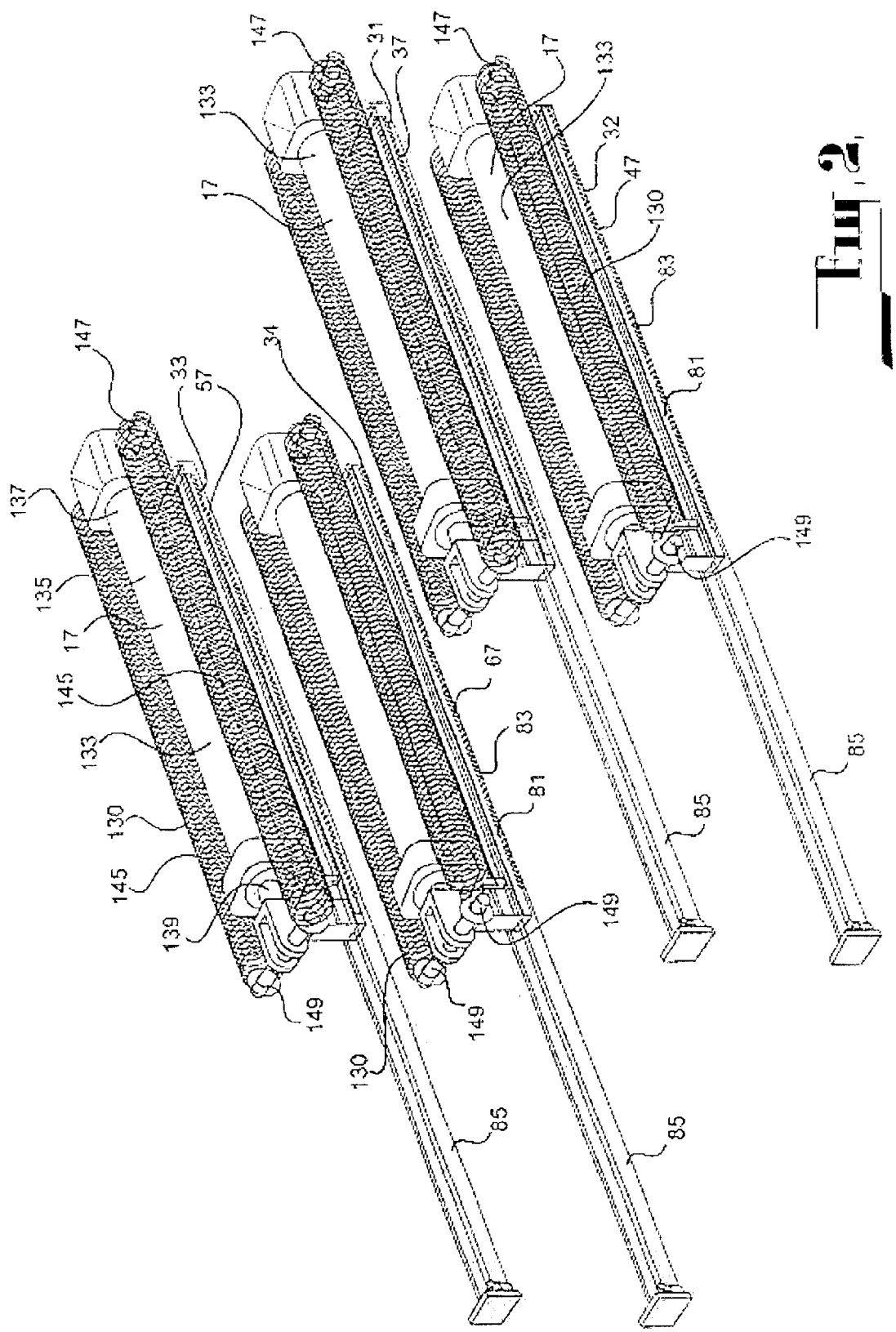
FIGS. 2 to 9 schematically illustrate drive mechanisms forming part of the engine of FIG. 1 in various operating conditions.
Figure 3:
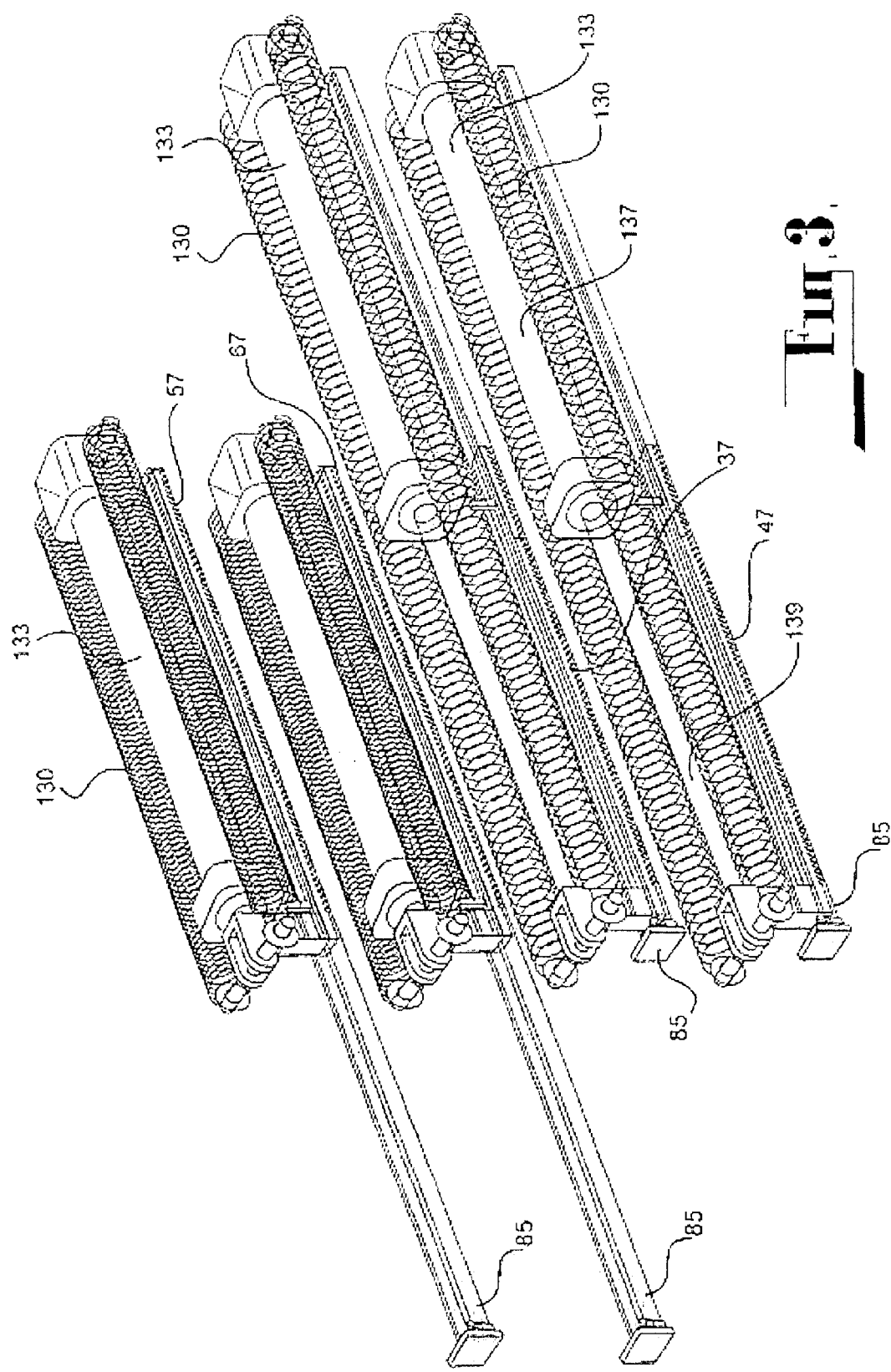

In FIG. 2 of the drawings, the engine is shown in a condition prior to start of its operation, with each of the racks, 37, 47, 57 and 67 being at rest. To commence operation of the engine, the power means 17 associated with the first and second racks 37, 47 are operated to rapidly load the spring structures 130 associated with those racks in preparation for their power strokes, as shown in FIG. 3.

Figure 4:
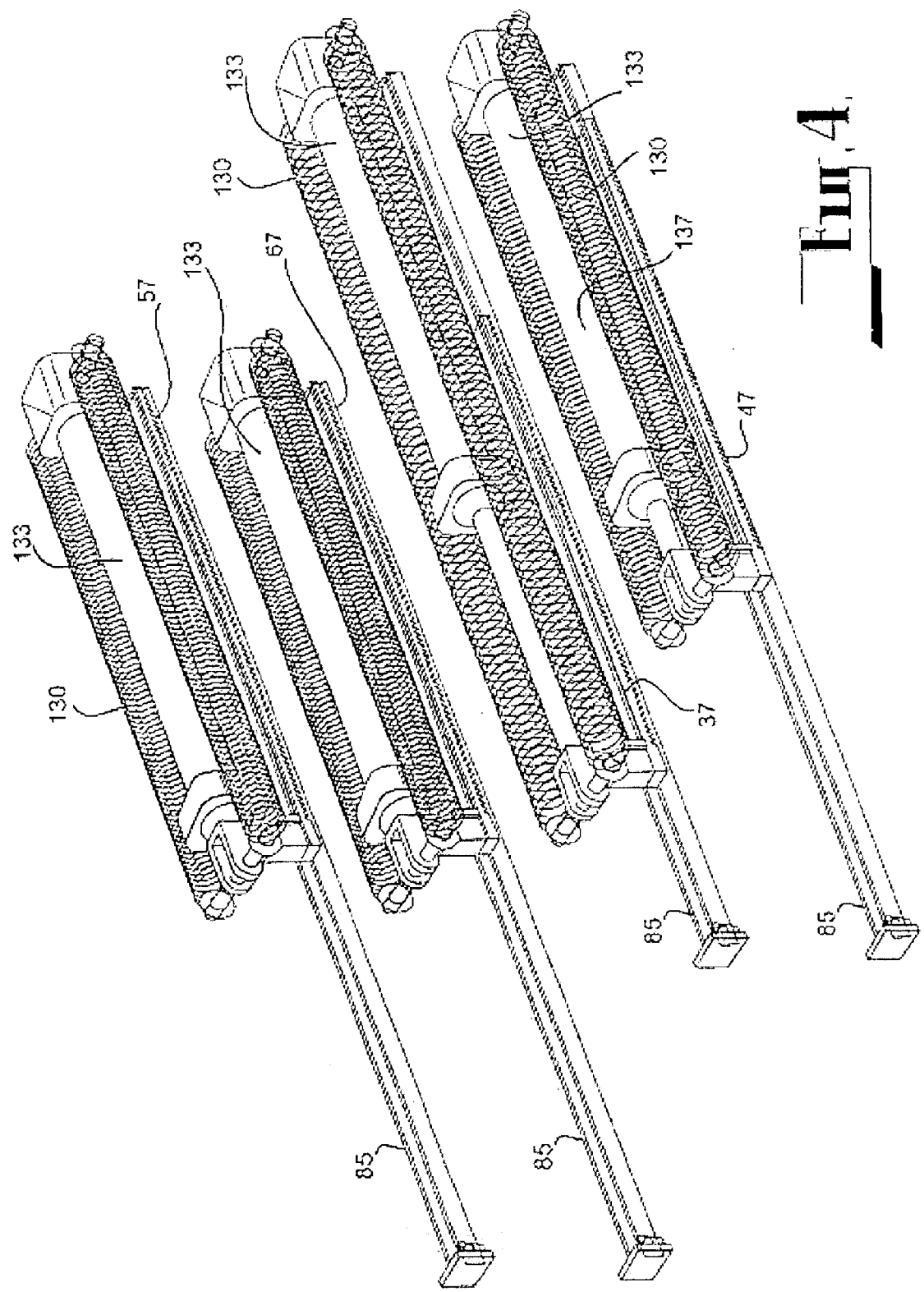
Figure 5:
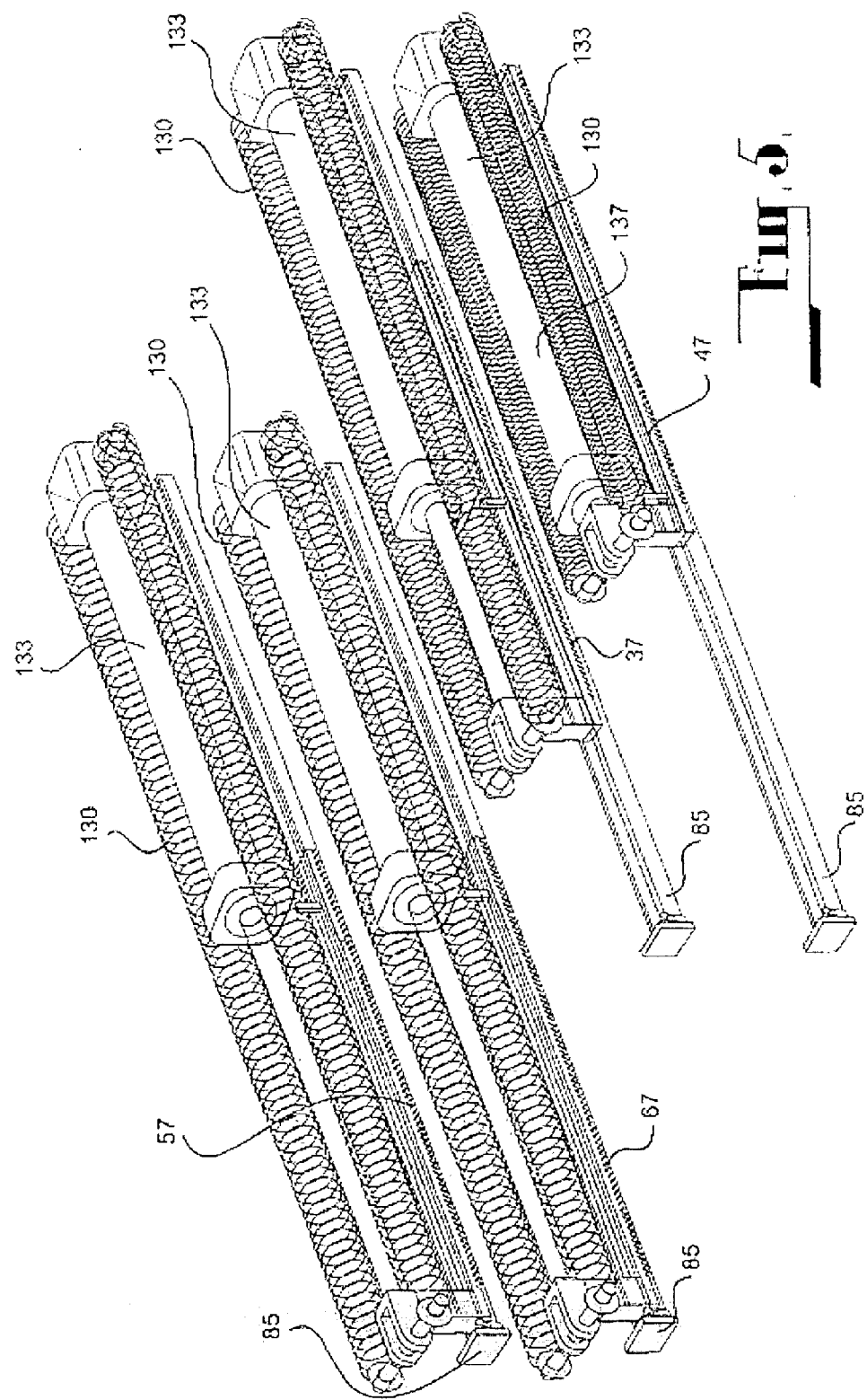
Figure 6:
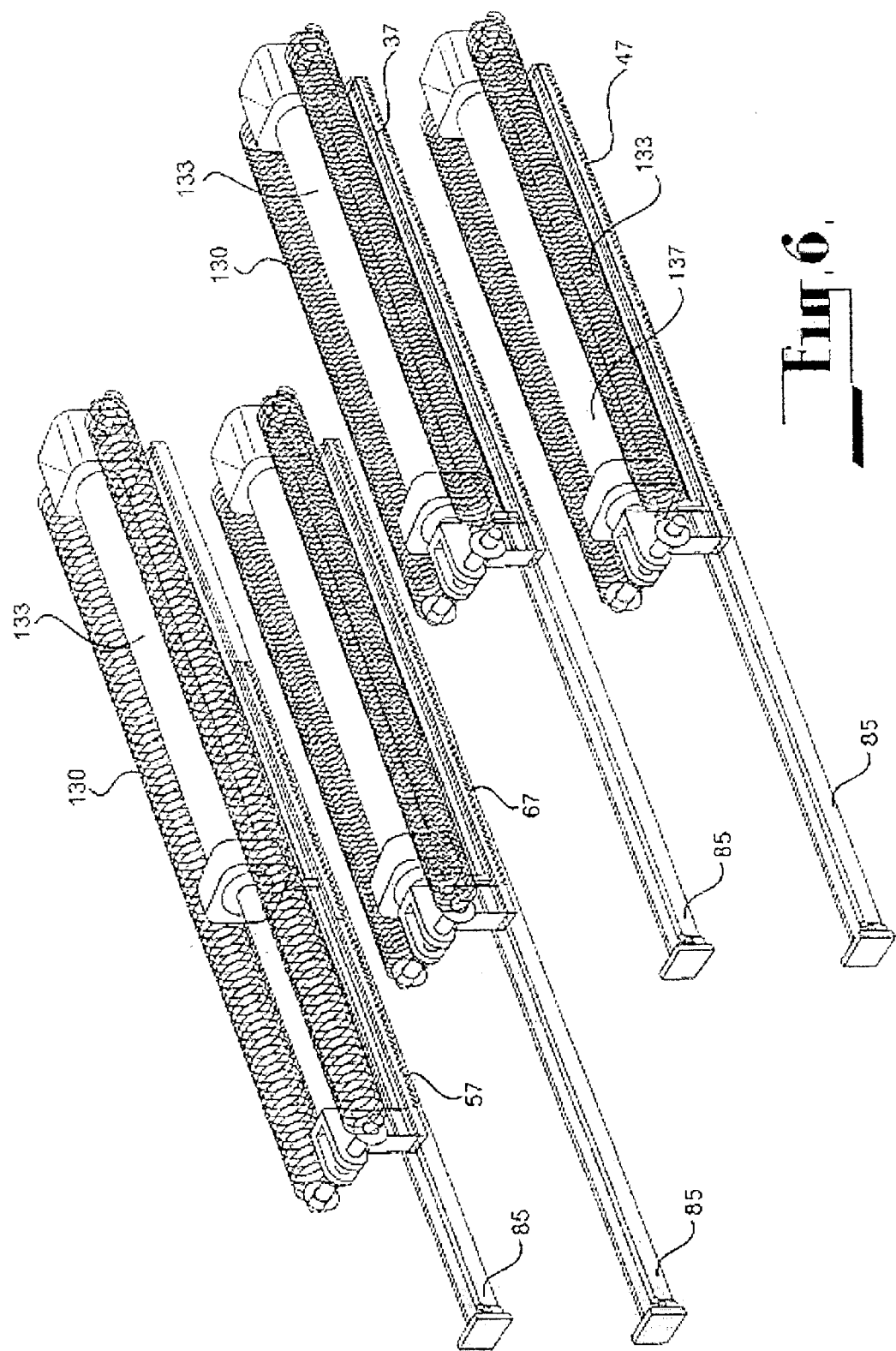

The first and second racks 37, 47 then commence their respective power strokes at the same time. The second rack 47 travels at a rate which is twice that of the first rack 37 as illustrated in FIG. 4. As the second rack 47 completes its power stroke, the power means 17 associated with the third and fourth racks 57, 67 then operate to cause those racks to undergo return strokes and to rapidly load the spring structures 130 associated with those racks in preparation for their power stroke, as is illustrated in FIG. 5. Since the second rack 47 travels at a rate which is twice that of the first rack, it completes its power stroke at the stage when the first rack 37 has completed one half of its power stroke. At this stage, the third and fourth racks 57, 67 commence their power strokes, while the first rack 37 continues its power stroke. The fourth rack 67 travels at a rate which is twice that of the third rack 57 and so completes its power stroke when the third rack 57 has only completed one half of its power stroke, as illustrated in FIG. 6. At this stage, the first rack 37 also completes its power stroke. The power means 17 associated with the first and second racks 37, 47 then operate to rapidly load the spring structures 130 associated with those racks in preparation for their next power stroke.

Figure 7:
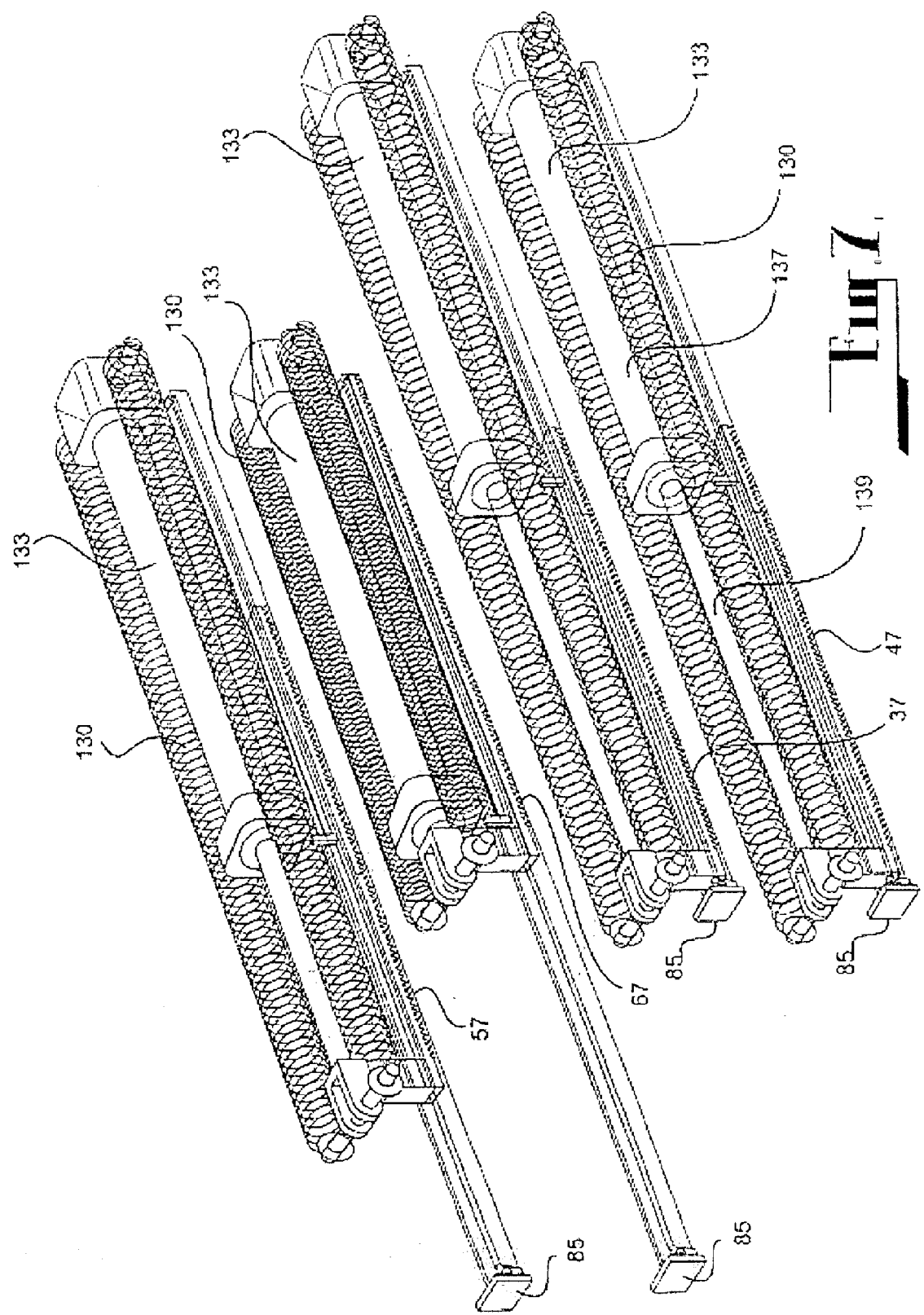
Figure 8:
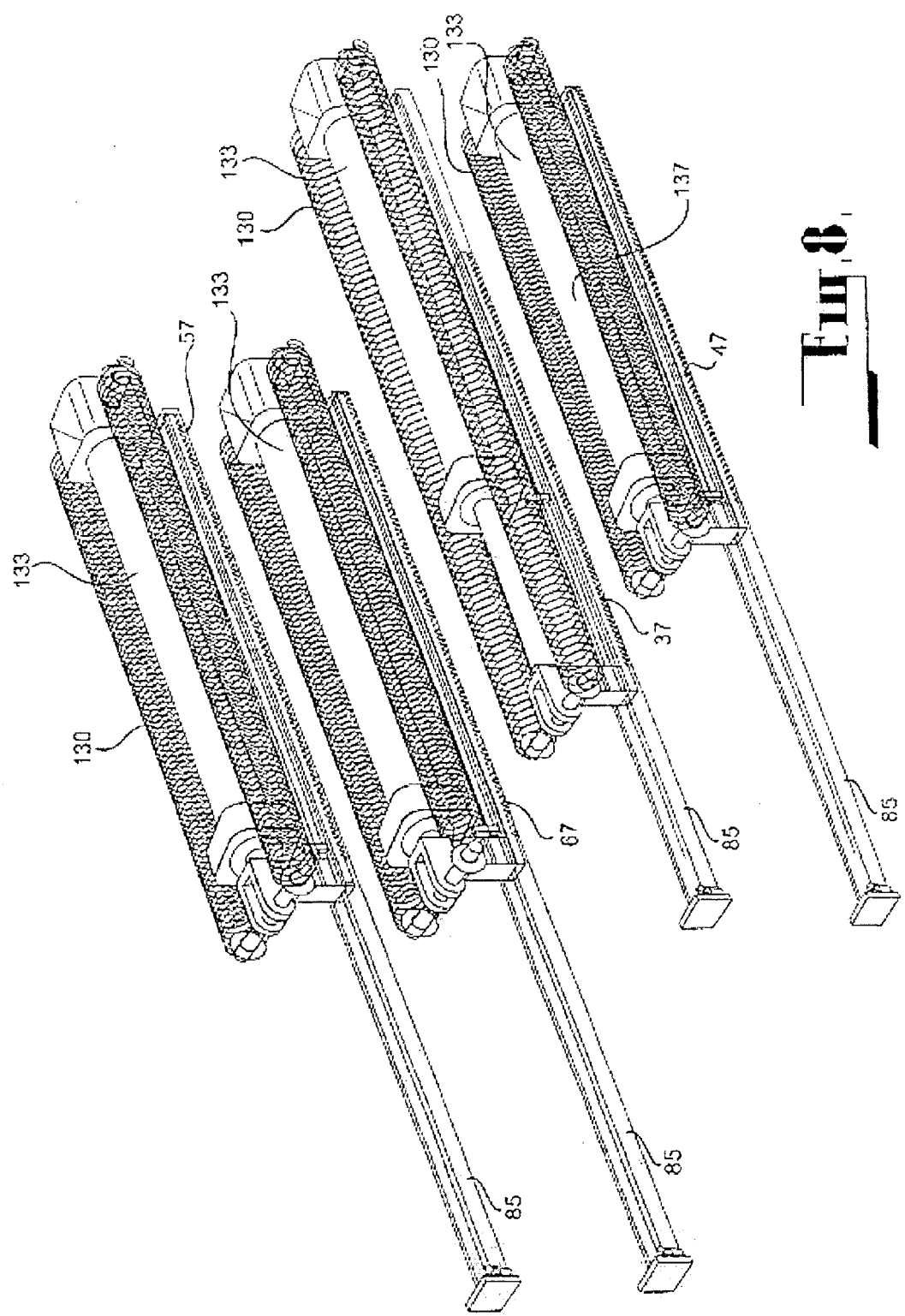
Figure 9:
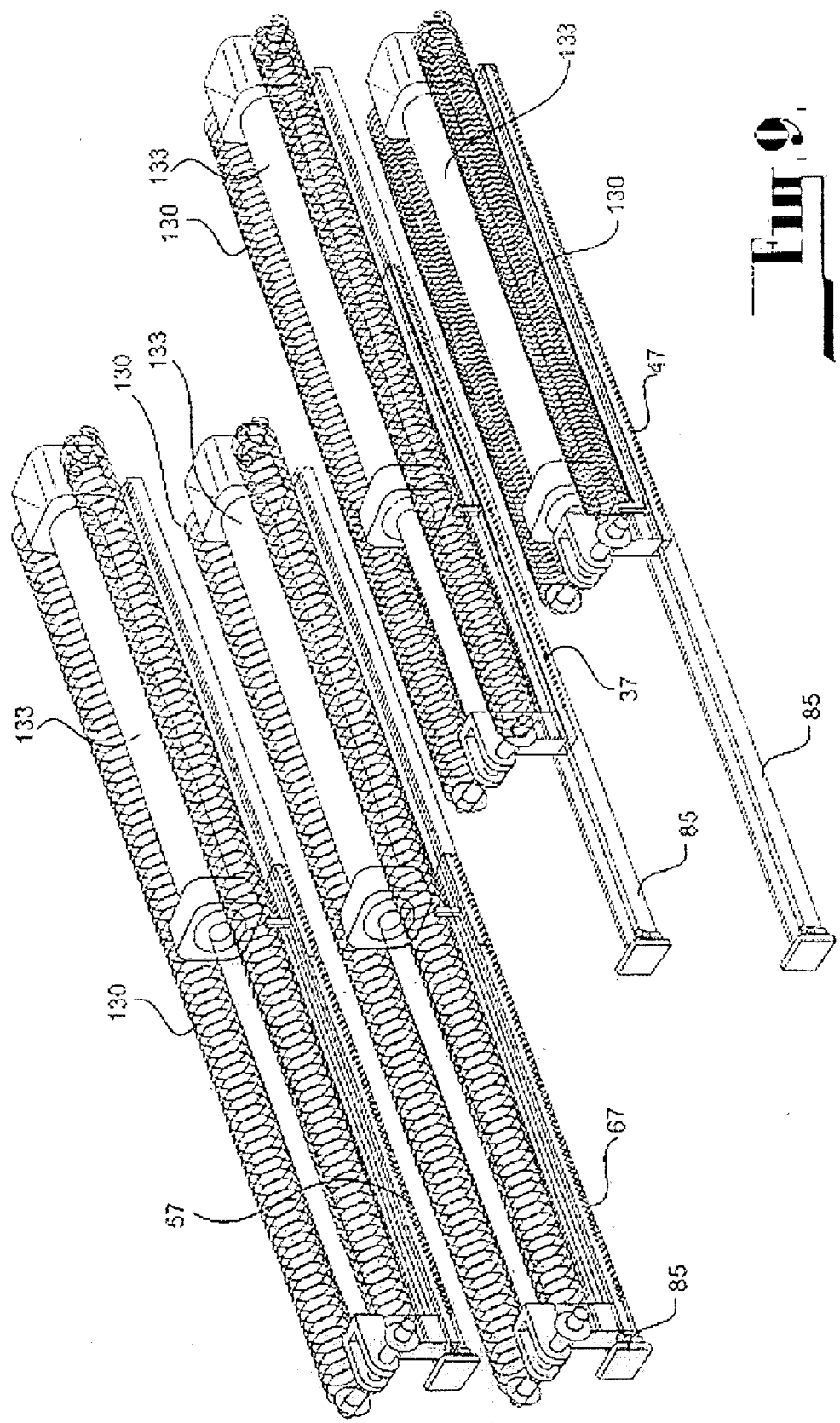
Figure 10:
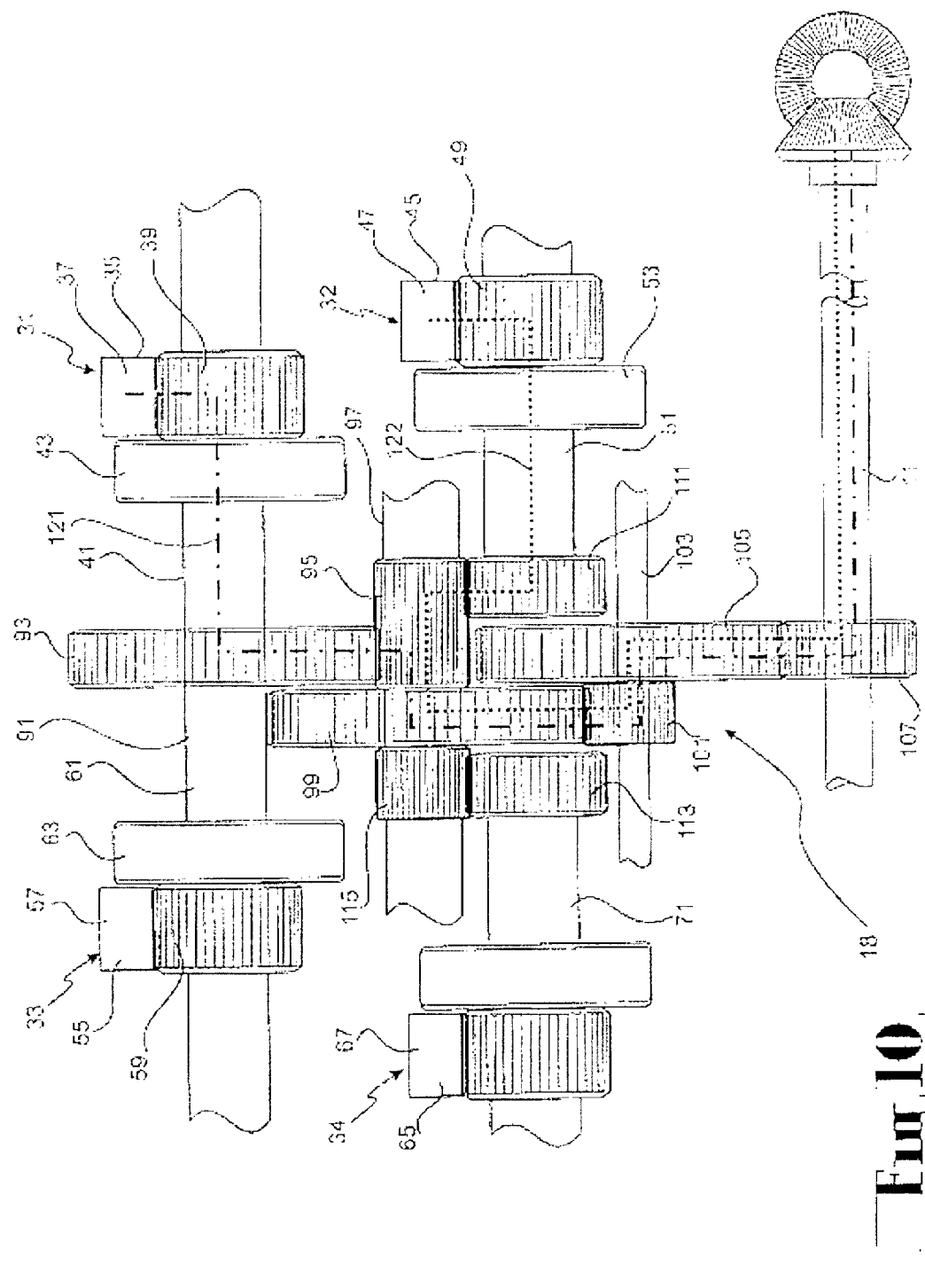
FIG. 10 is a schematic view of gearing forming part of the engine, with two drive transfer paths being identified within the gearing.
Figure 11:
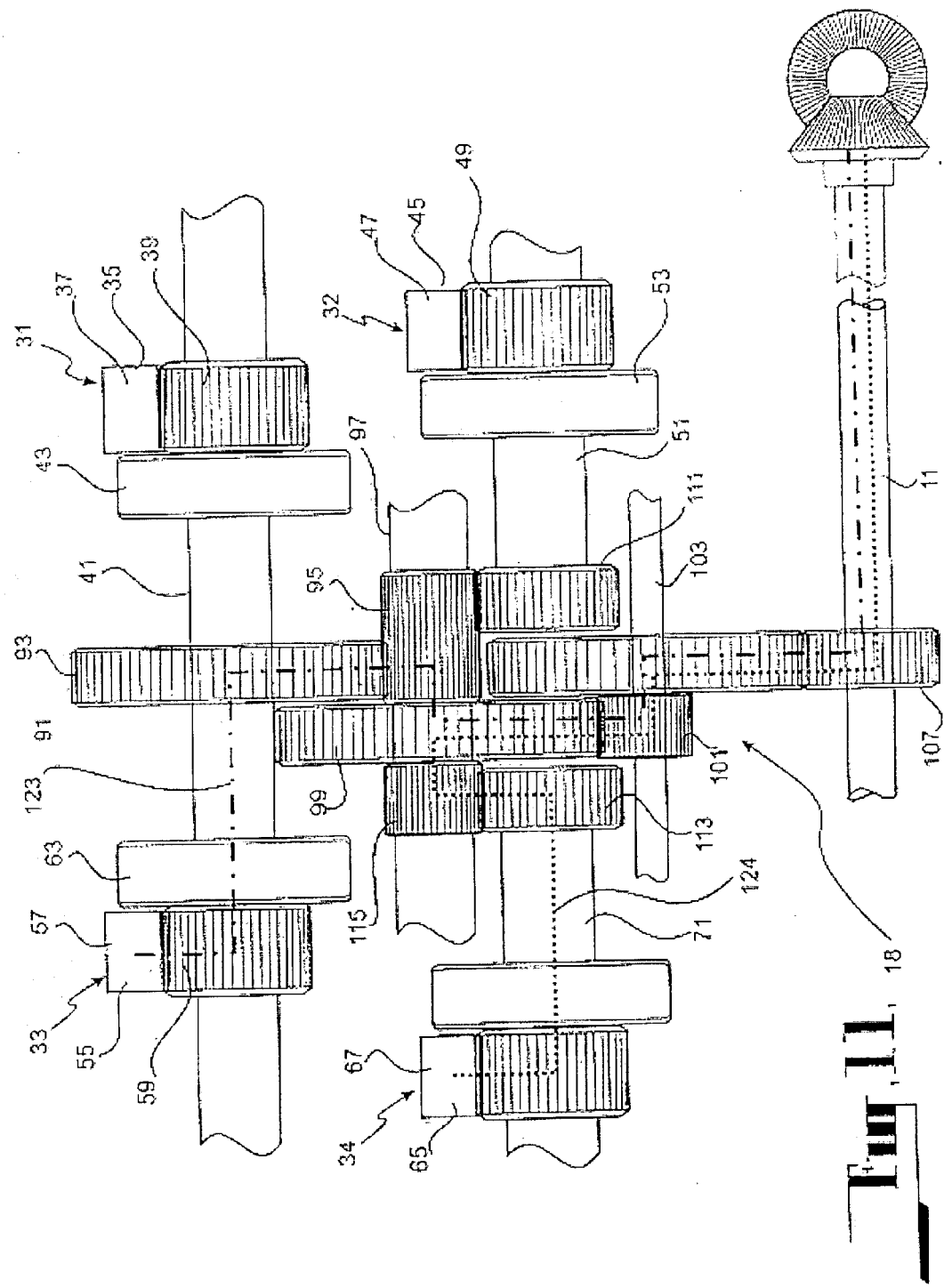
FIG. 11 is a view similar to FIG. 10 with the exception that two other drive transfer paths are identified.

The first and second racks 37, 47 commence their power strokes, and the third rack 57 continues with its power stroke, as illustrated in FIG. 7. The third rack 57 completes its power stroke at the same stage that the second rack 47 completes its power stroke as illustrated in FIG. 8. The power means 17 associated with the third and fourth racks 57, 67 then operate to rapidly load the spring structures 130 associated with those racks in preparation for the next power stroke, as illustrated in FIG. 9. The operating cycle of the engine continues in this fashion. Because of the overlap between the various power strokes, the drive shaft 11 has rotational torque applied to it substantially constantly during operation of the engine.

From the foregoing it can be seen that the hydraulic rams 135 are operated intermittently so as to load the spring structures 130 as required. The loading operation of the spring structures 130 occurs rapidly in comparison to the time taken for the loaded springs to drive the racks in the direction applying rotational torque to the respective input shafts. In other words, the return stroke of each rack is rapid while the power stroke is prolonged. In this way, there is prolonged delivery of torque to the input shafts with intermittent energy input to the spring structures by virtue of the rapid loading of the spring structures using the power mechanisms.

The present embodiment thus provides a simple yet highly effective engine which is capable of prolonged delivery of mechanical work at the drive shaft 11 with only intermittent energy input provided by the power means 17.

Figure 12:
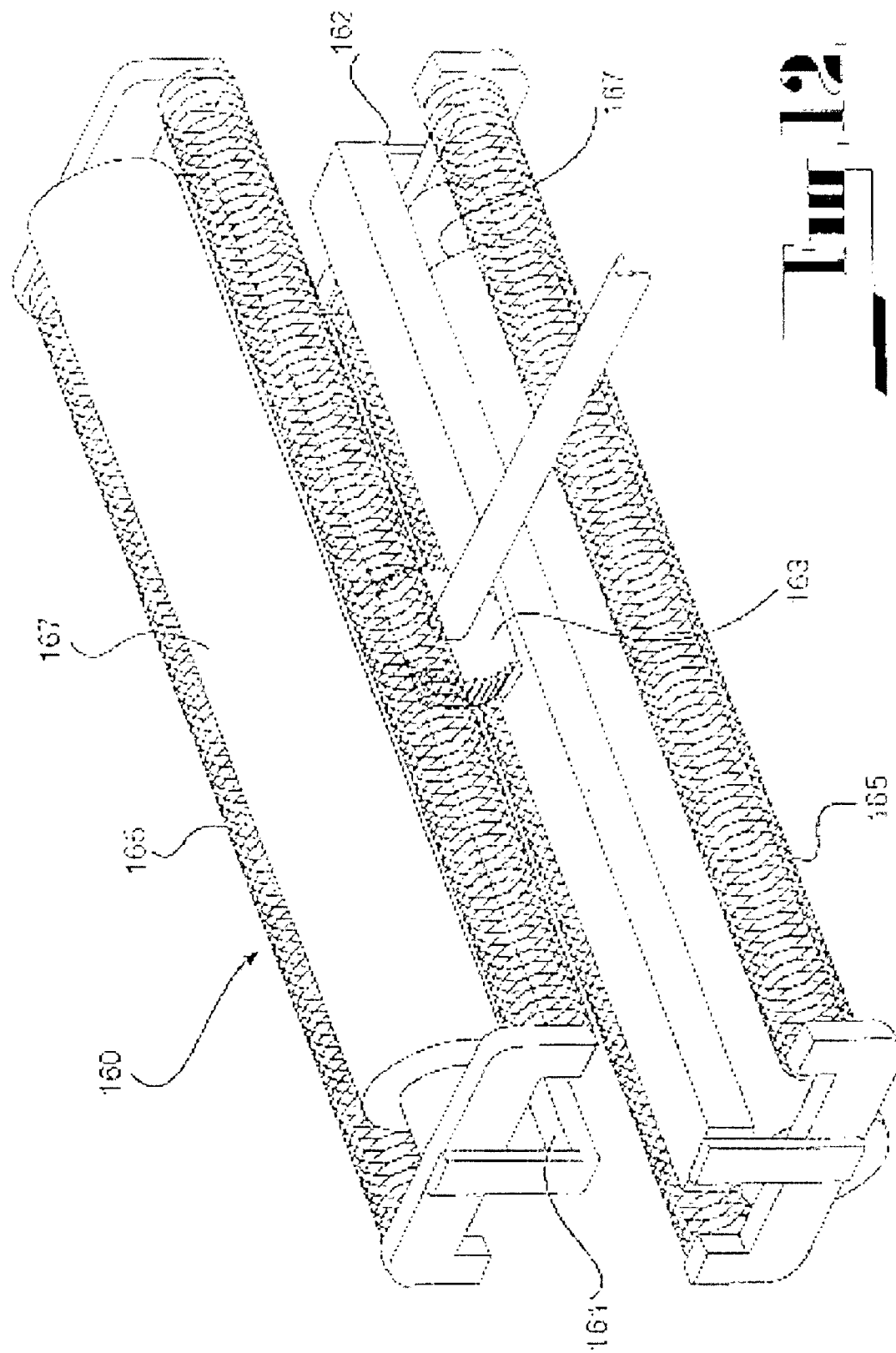
FIG. 12 is a schematic perspective view of a drive mechanism of the engine according to a second embodiment, the drive mechanism being shown in one operating condition.
Figure 13:
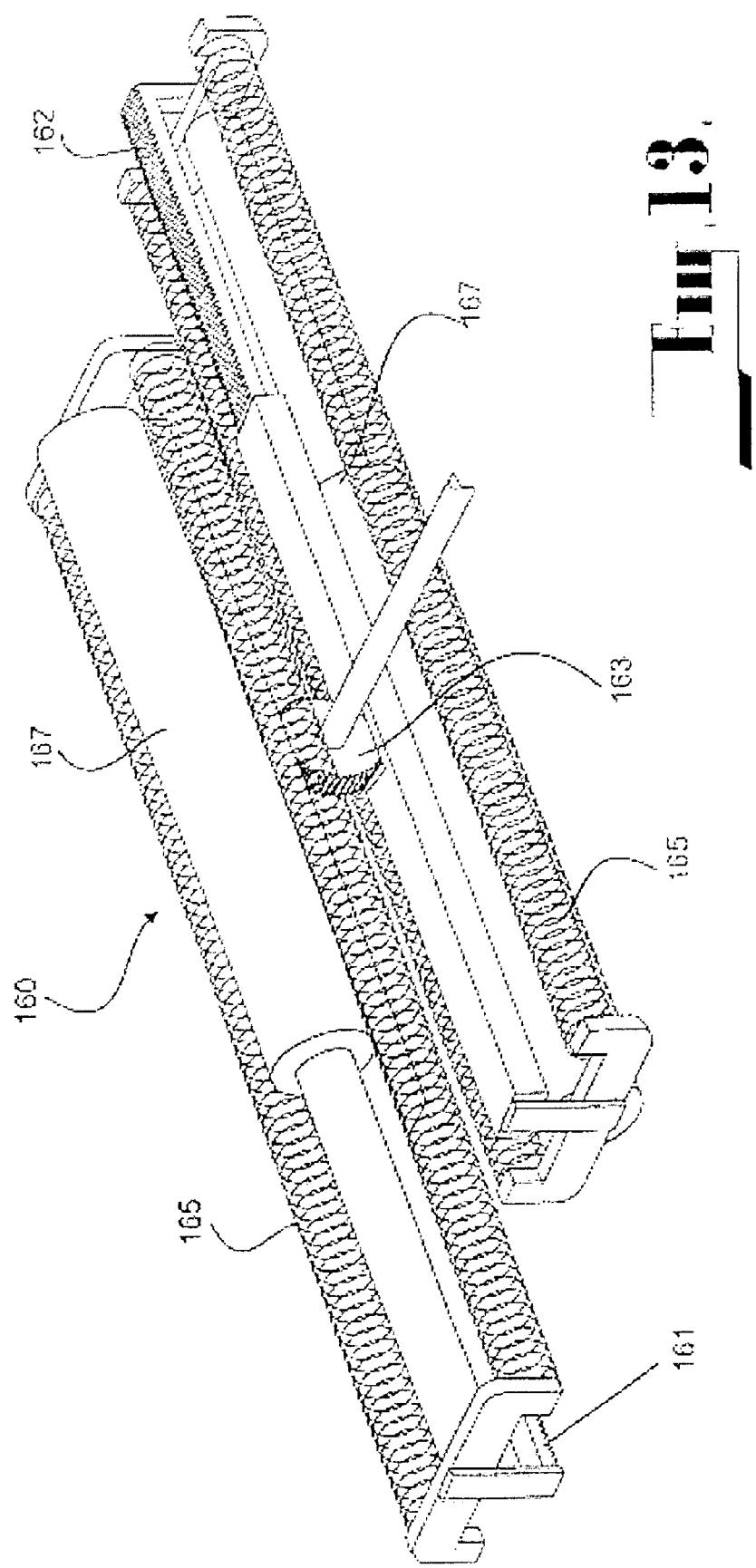
FIG. 13 is a view similar to FIG. 12 with the exception that the drive mechanism is shown in another operating condition.

In the embodiment which has been described, each input shaft 41, 51, 61 and 71 has a pinion 39, 49, 59 and 69 mounted on it, and the pinion is in meshing engagement with the respective rack 37, 47, 57 and 67. In a second embodiment, which is illustrated in FIGS. 12 and 13, each drive mechanism is in the form of a rack and pinion mechanism 160 comprising two racks 161, 162 and a pinion 163 in meshing engagement with the racks. One rack 161 is positioned above the pinion 163 and the other rack 162 is positioned below the pinion. The two racks 161, 162 are adapted to operate in unison but in opposite directions. In this way, the rack 161 performs its power stroke while moving in one direction and the rack 162 performs a simultaneous power stroke while moving in the opposite direction. Each rack 161, 162 has a spring structure 165 and hydraulic ram 167 associated with it in a similar fashion to the first embodiment.

Such an arrangement is advantageous as it allows greater torque to be delivered to pinion 163, and so to the input shaft to which the pinion is drivingly connected, in a shorter period of time. The arrangement is also conducive to a more compact construction of engine.

Rack and pinion mechanisms 160 according to this embodiment can replace the rack and pinion mechanisms 35, 45, 55 and 65 in the first embodiment, if desired.

Figure 14:
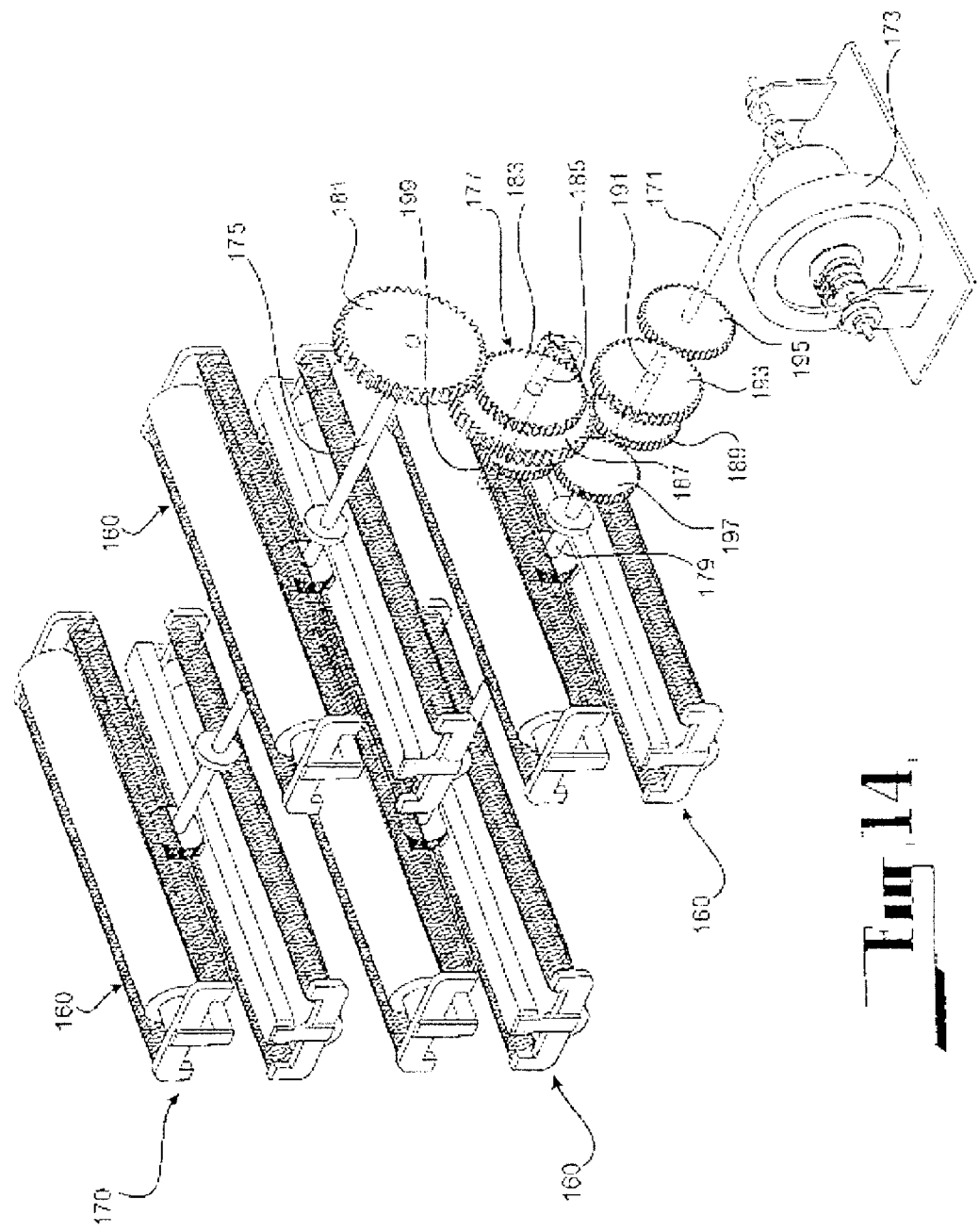
FIG. 14 is a schematic perspective view of an engine according to the second embodiment.
Figure 15:
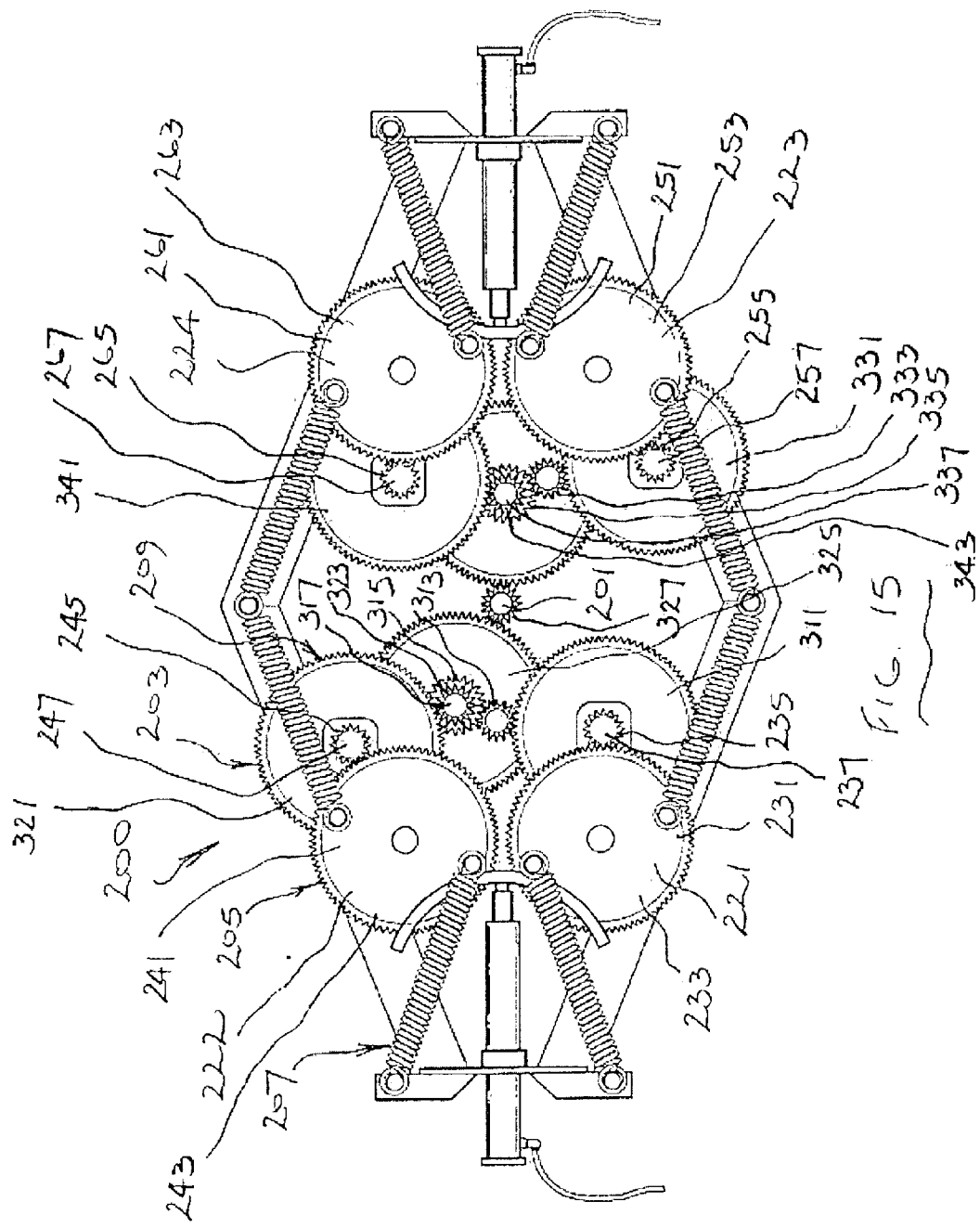
FIG. 15 is a schematic elevational view of an engine according a third embodiment viewed from one side thereof.
Figure 16:
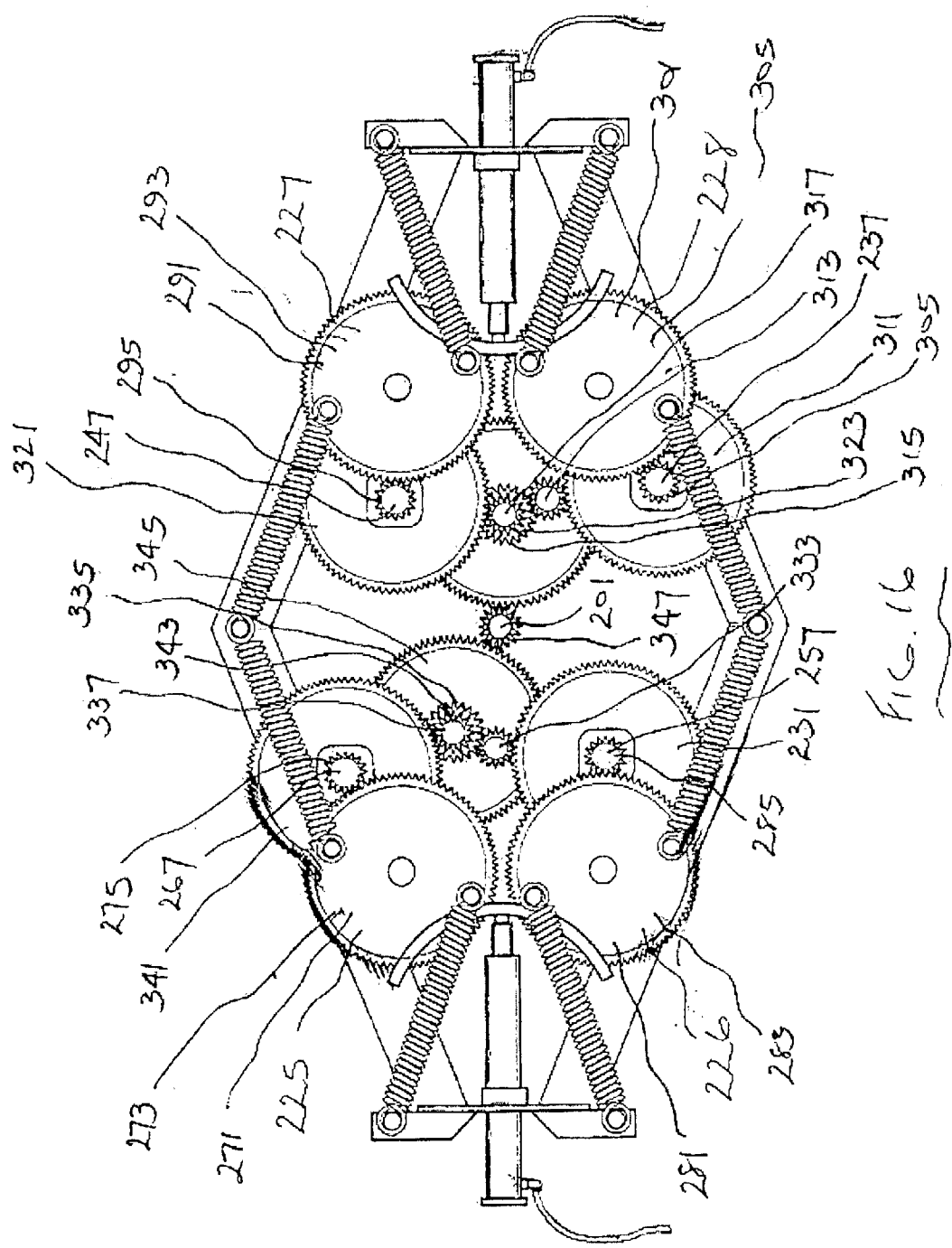
FIG. 16 is a view similar to FIG. 15 with the exception that the engine is viewed from the other side thereof.
Figure 17:
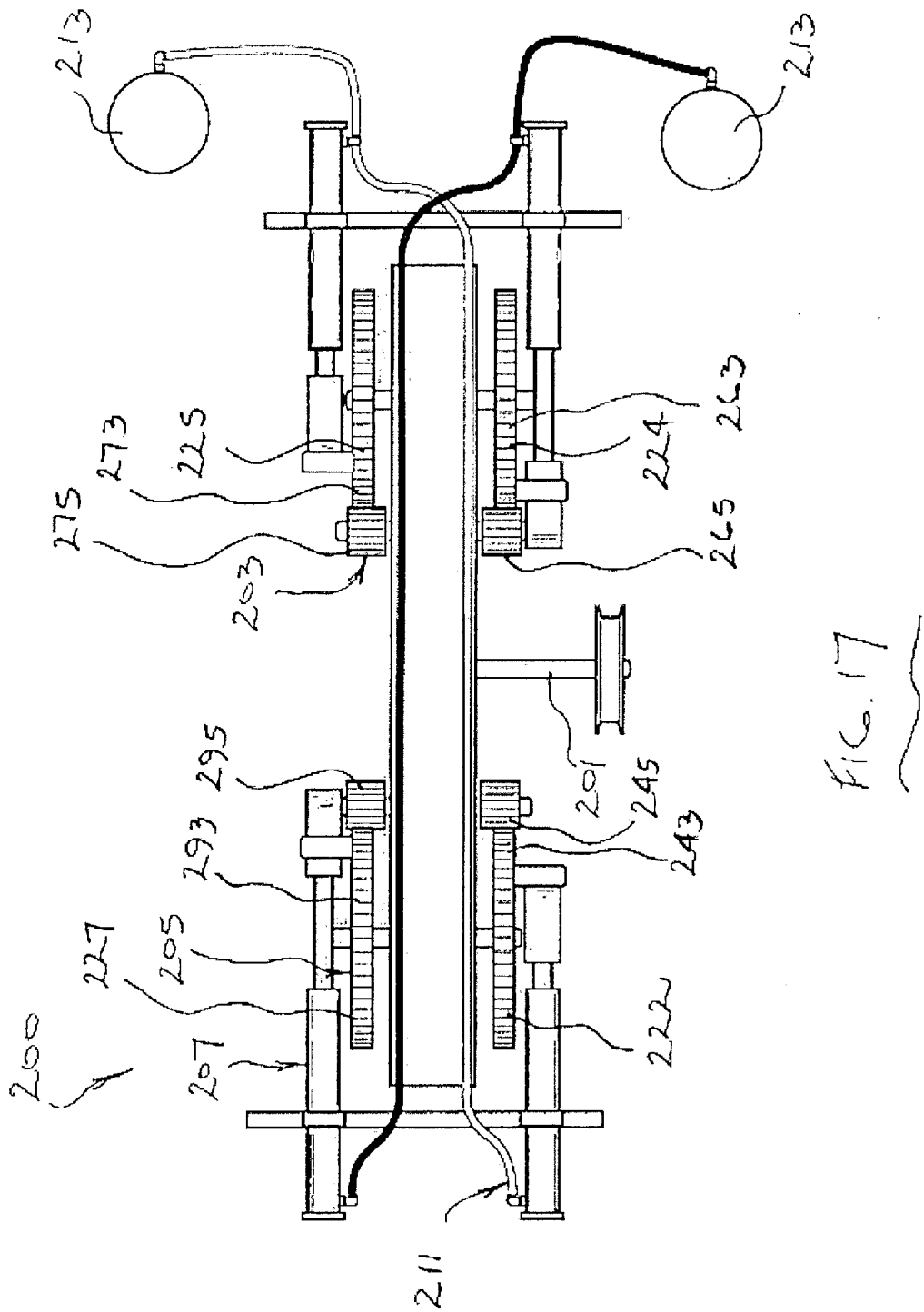
FIG. 17 is a schematic plan view of the engine according to the third embodiment.
Figure 18:
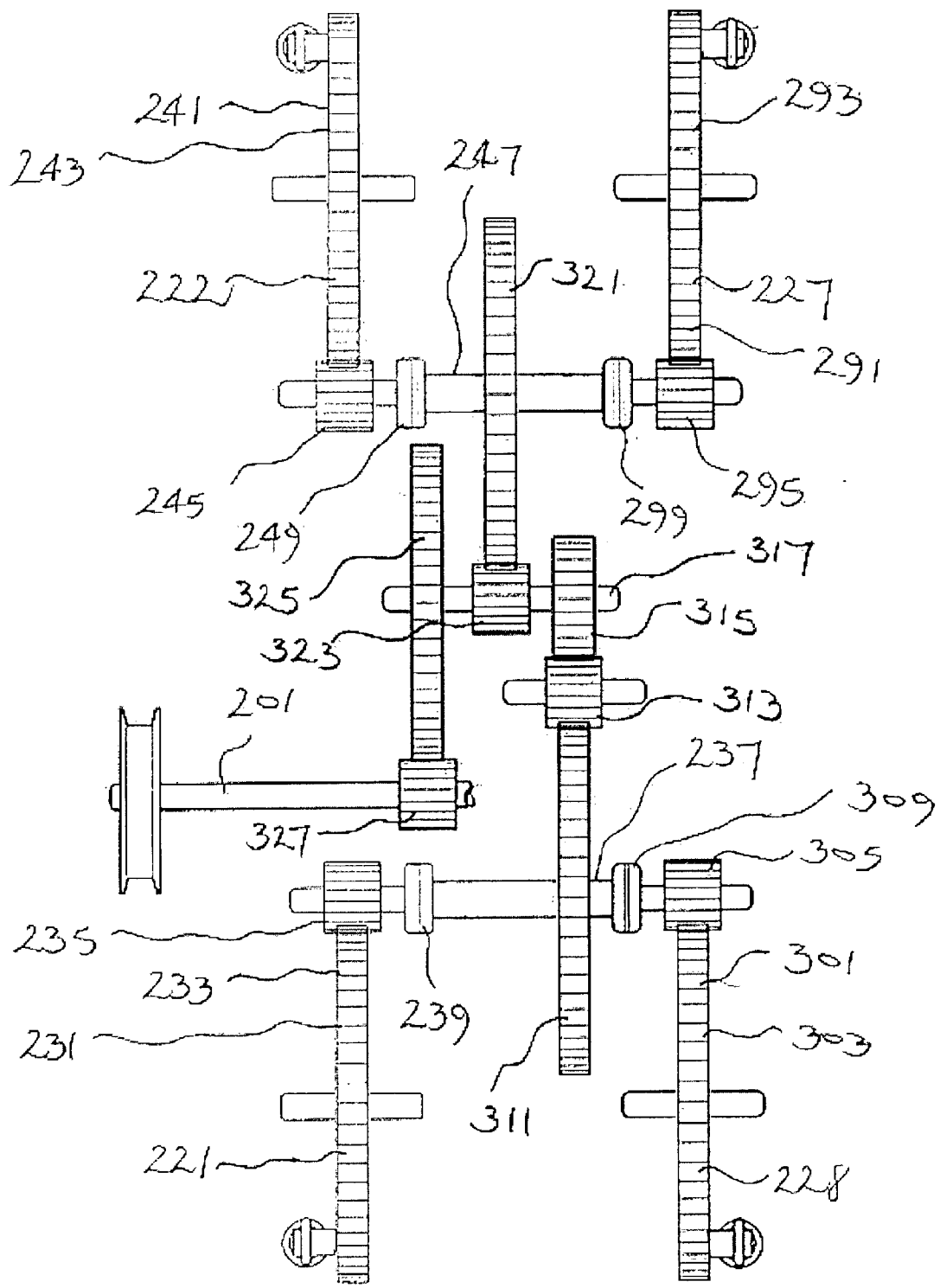
FIG. 18 is an elevational view of part of a drive system for the engine according to the third embodiment.
Figure 19:
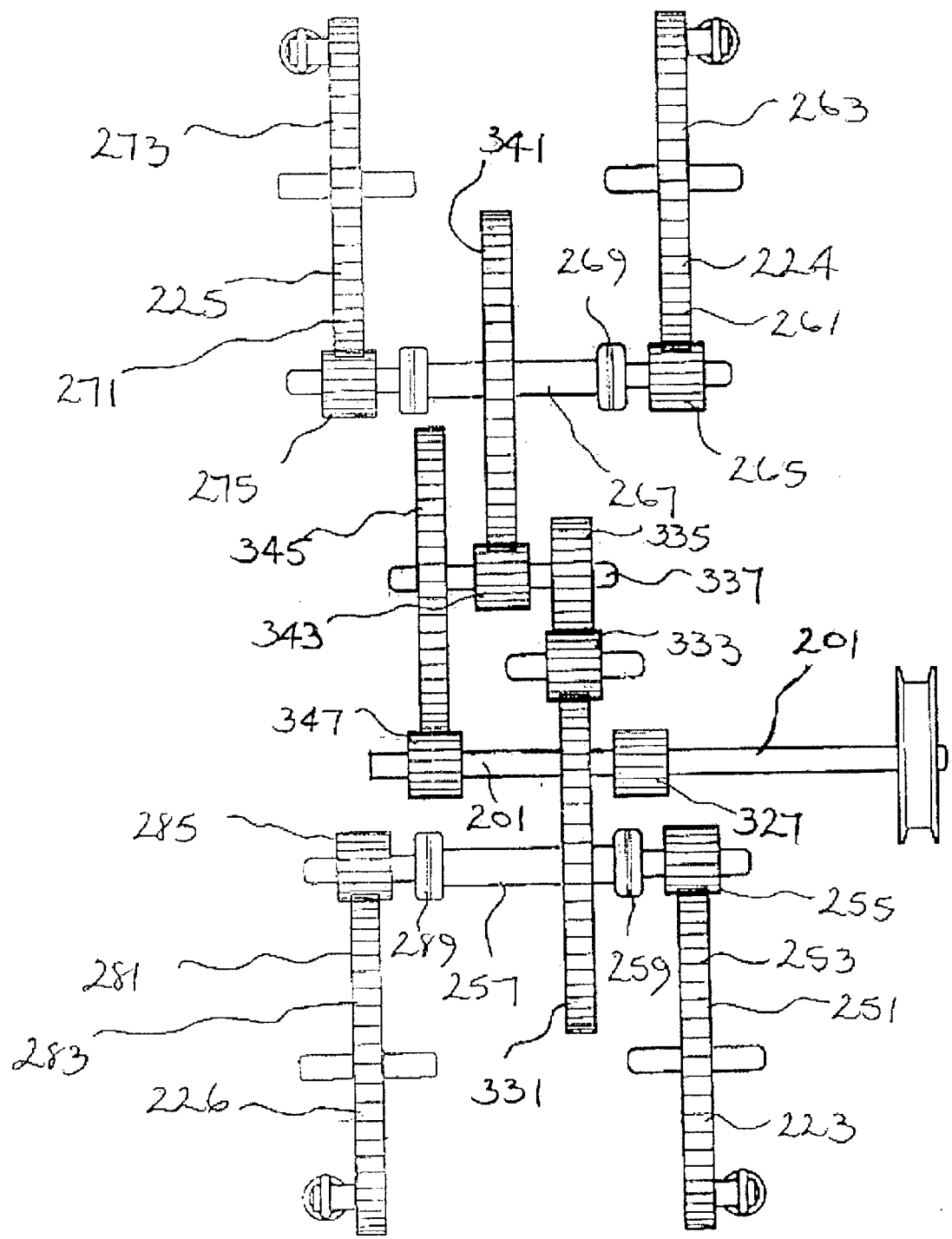
FIG. 19 is a view similar to FIG. 18 with the exception that a further part of the drive system is illustrated.

Rack and pinion mechanisms 160 as illustrated in FIGS. 12 and 13 are also utilised in engine 170 according to a third embodiment, as illustrated in FIG. 14.

The engine 170 according to this embodiment has a drive shaft 171 which is drivingly connected to an electrodynamic machine 173.

The engine 170 has a first input shaft 175 which is drivingly connected to the drive shaft 171 through gearing 177, and a second input shaft 179 which is also drivingly connected to the drive shaft 171 through the gearing. A plurality of the rack and pinion mechanisms 160 are operatively connected to the first input shaft. Similarly, a plurality of the rack and pinion mechanisms 160 are operatively connected to the second input shaft. The various rack and pinion mechanisms 160 operate in timed sequence in order to apply rotational torque to the first and second input shafts 175, 179. More particularly, the rack and pinion mechanisms 160 operatively connected to the second input shaft 179 operate at a faster rate (for example, twice the rate) of the rack and pinion mechanisms 160 operatively connected to the first input shaft 175. In this way, the engine 170 operates in a somewhat similar fashion to the engine 10 of the first embodiment. Rotational torque applied to the first and second input shafts 175, 179 is transmitted through the gearing 177 to the drive shaft 171.

The gearing 177 includes a drive gear 181 which is rigidly mounted on the first input shaft 175. With this arrangement, the drive gear 181 is caused to rotate upon rotation of the first input shaft 175. The drive gear 181 is in meshing engagement with a driven gear 183 rigidly mounted on a first lay shaft 185. A drive gear 187 is rigidly mounted on the first lay shaft 185 and is in meshing engagement with a driven gear 189 rigidly mounted on a second lay shaft 191. A drive gear 193 is rigidly mounted on the second lay shaft 193 and is in meshing engagement with a driven gear 195 rigidly mounted on the drive shaft 171.

A drive gear 197 is rigidly mounted on the second input shaft 179 and is in meshing engagement with a driven gear 199 rigidly mounted on the first lay shaft 185.

While the engine 170 is shown with two rack and pinion mechanisms 160 operatively connected to the first input shaft 175, it should be appreciated that any number of such rack and pinion mechanisms can be operatively connected to the first input shaft. Similarly, while the engine 170 is shown with two rack and pinion mechanisms 160 operatively connected to the second input shaft 179, it should be appreciated that any number of such rack and pinion mechanisms can be operatively connected to that shaft.

The rack and pinion mechanisms operatively connected to each input shaft 175, 179 are intended to operate in a timed sequence so that rotational torque is delivered in a uniform manner to those shafts.

While in each embodiment described so far, each drive mechanism 16 has been described as a rack and pinion mechanism, it need not be limited thereto. The rack may, for example, be replaced by a large gear wheel which meshes with the pinion. Such an arrangement is disclosed in the embodiment illustrated in FIGS. 15 to 22.

The embodiment illustrated in FIGS. 15 to 22 is directed to an engine 200 in which gear and pinion mechanisms rather than rack and pinion mechanisms are employed.

The engine 200 includes a drive shaft 201 through which mechanical work is delivered. The drive shaft 201 is driven by a drive system 203 which incorporates various drive mechanisms 205, power means 207 for operating the drive mechanisms 205, and gearing 209 for drivingly connecting the drive mechanisms 205 to the drive shaft 201.

The engine 200 further comprises a hydraulic circuit 211 which incorporates a reservoir (not shown) to contain a supply of hydraulic fluid and electrically operable hydraulic pumps 213 for pumping the hydraulic fluid through the hydraulic circuit.

The various drive mechanisms 205 comprise a first drive mechanism 221, a second drive mechanism 222, a third drive mechanism 223, a fourth drive mechanism 224, a fifth drive mechanism 225, a sixth drive mechanism 226, a seventh drive mechanism 227, and an eighth drive mechanism 228.

The first drive mechanism 221 is in the form of a first gear and pinion mechanism 231 comprising a first gear 233 and a first pinion 235 in meshing engagement with the first gear 233. The first pinion 235 is connected to a first input shaft 237 through a clutch mechanism 239. The clutch mechanism 239 allows torque transmission from the first pinion 235 to the first input shaft 237 upon rotation of the pinion 235 in one direction while allowing the pinion 235 to freewheel with respect to the input shaft 237 upon rotation of the pinion 235 in the reverse direction so as not to transmit torque.

The second drive mechanism 222 is in the form of a second gear and pinion mechanism 241 comprising a second gear 243 and a second pinion 245 in meshing engagement with the second gear 243. The second pinion 245 is connected to a second input shaft 247 through a clutch mechanism 249. The clutch mechanism 249 allows torque transmission from the second pinion 245 to the input shaft 247 upon rotation of the second pinion 245 in one direction while allowing the second pinion 245 to freewheel with respect to the input shaft 247 upon rotation of the second pinion 245 in the reverse direction so as not to transmit torque.

The third drive mechanism 223 is in the form of a third gear and pinion mechanism 251 comprising a third gear 253 and a third pinion 255 in meshing engagement with the third gear 253. The third pinion 255 connected to a third input shaft 257 through a clutch mechanism 259. The clutch mechanism 259 allows torque transmission from the third pinion 255 to the input shaft 257 upon rotation of the third pinion 255 in one direction while allowing the third pinion 255 to freewheel with respect to the input shaft 257 upon rotation of the third pinion 255 in the reverse direction so as not to transmit torque.

The fourth drive mechanism 224 is in the form of a fourth gear and pinion mechanism 261 comprising a fourth gear 263 and a fourth pinion 265 in meshing engagement with the fourth gear 263. The fourth pinion 265 is connected to a fourth input shaft 267 through a clutch mechanism 269. The clutch mechanism 269 allows torque transmission from the fourth pinion 265 to the fourth input shaft 267 upon rotation of the fourth pinion 265 in one direction while allowing the fourth pinion 265 to freewheel on the fourth input shaft 267 upon rotation of the fourth pinion 265 in the reverse direction so as not to transmit torque.

The fifth drive mechanism 225 is in the form of a fifth gear and pinion mechanism 271 comprising a fifth gear 273 and a fifth pinion 275 in engagement with the fifth gear 273. The fifth pinion 275 is connected to the fourth input shaft 267 mounted through a clutch mechanism 279. The clutch mechanism 279 allows torque transmission from the fifth pinion 275 to the fourth input shaft 267 upon rotation of the pinion in one direction while allowing the pinion to freewheel on the fourth input shaft upon rotation of the pinion in the reverse direction so as not to transmit torque.

The sixth drive mechanism 226 is in the form of a sixth gear and pinion mechanism 281 comprising a sixth gear 286 and a sixth pinion 285 in engagement with the sixth gear 283. The sixth pinion 285 is connected to the third input shaft 257 through a clutch mechanism 289. The clutch mechanism 289 allows torque transmission from the sixth pinion 285 to the third input shaft 257 upon rotation of the pinion in one direction while allowing the pinion to freewheel on the third input shaft upon rotation of the pinion in the reverse direction so as not to transmit torque.

The seventh drive mechanism 227 is in the form of a seventh gear and pinion mechanism 291 comprising a seventh gear 293 and a seventh pinion 295 in engagement with the seventh gear 293. The seventh opinion 295 is connected to the second input shaft 247 through a clutch mechanism 299. The clutch mechanism 299 allows torque transmission from the seventh pinion 295 to the second input shaft 247 upon rotation of the pinion in one direction while allowing the pinion to freewheel on the second input shaft upon rotation of the pinion in the reverse direction so as not to transmit torque thereto.

The eighth drive mechanism 228 is in the form of an eighth gear and pinion mechanism 301 comprising an eighth gear 303 and an eighth pinion 305 in engagement with the eighth gear 303. The eighth pinion 305 is connected to the first input shaft 237 through a clutch mechanism 309. The clutch mechanism 309 allows torque transmission from the eighth pinion 305 to the first input shaft 237 upon rotation of the pinion in one direction while allowing the pinion to freewheel on the first input shaft upon rotation of the pinion in the reverse direction so as not to transmit torque.

In this embodiment, the gear of each of the gear and pinion mechanisms forming the various drive mechanisms 205 has 120 teeth and the pinion has 12 teeth.

A first drive gear 311 is mounted on the first input shaft 237 for rotation therewith. The first drive gear 311 is in meshing engagement with an idler gear 313 which in turn is in meshing engagement with a first driven gear 315 rigidly mounted on a layshaft 317.

A second drive gear 321 is rigidly mounted on the second input shaft 247 for rotation therewith. The second drive gear 321 is in meshing engagement with a second driven gear 323 which is rigidly mounted on the layshaft 317 for rotation therewith.

A first output gear 325 is rigidly mounted on the layshaft 317 for rotation therewith. The first output gear 325 is in meshing engagement with a first output pinion 327 rigidly mounted on the drive shaft 201.

The first driven gear 315 is larger than the second driven gear 323. More particularly, in this embodiment the first driven gear 315 has 30 teeth and the second driven gear 323 has 20 teeth. The first and second drive gears 311, 321 each have 120 teeth. The reason for the first driven gear 315 being larger than the second driven gear 323 is to provide different transmission ratios between the first and second drive mechanisms 221, 222 respectively and the drive shaft 201, and similarly different transmission ratios between the seventh and eighth drive mechanisms 227, 228 respectively and the drive shaft.

It will be noted that the transmission ratio between the first drive mechanism 221 and the drive shaft 201, and the transmission ratio between the eighth drive mechanism 228 and the drive shaft 201, are the same. Similarly, the transmission ratio between the second drive mechanism 222 and the drive shaft 201 and the seventh drive mechanism 227 and the drive shaft 201 are the same.

A third drive gear 331 is mounted on the third input shaft 257 for rotation therewith. The third drive gear 331 is in meshing engagement with an idler gear 333 which is in turn in meshing engagement with a third driven gear 335. The third driven gear 335 is rigidly mounted on a layshaft 337 for rotation therewith.

A fourth drive gear 341 is rigidly mounted on the fourth input shaft 267 for rotation therewith. The fourth drive gear 341 is in meshing engagement with a fourth driven gear 343 which is rigidly mounted on the layshaft 337 for rotation therewith.

A second output gear 345 is rigidly mounted on the layshaft 337 for rotation therewith and is in meshing engagement with a second output pinion 347 rigidly mounted on the output shaft 201 for rotation therewith.

The third driven gear 335 is larger than the fourth driven gear 343. More particularly, in this embodiment the third driven gear 335 has 30 teeth and the fourth driven gear 343 has 20 teeth. The third and fourth drive gears 331, 341 each have 120 teeth. The reason for the third driven gear 335 being larger than the fourth driven gear 343 is to provide different transmission ratios between the fourth and fifth drive mechanisms 224, 225 respectively and the drive shaft 201, and similarly different transmission ratios between the third and sixth drive mechanisms 223, 226 respectively and the drive shaft.

It will be noted that the transmission ratio between the fourth drive mechanism 224 and the drive shaft 201, and the transmission ratio between the fifth drive mechanism 225 and the drive shaft 201, are the same. Similarly the transmission ratio between the third drive mechanism 223 and the drive shaft 201 and the sixth drive mechanism 226 and the drive shaft 201 are the same.

The various drive mechanisms 205 operate in pairs. Specifically, the first and second drive mechanisms 221, 222 operate as a pair, as does the third and fourth drive mechanisms 223, 224, the fifth and sixth drive mechanisms 225, 226, and the seventh and eighth drive mechanisms 227, 228.

The two drive mechanisms of each pair are disposed on the same side of the engine 200 with one above the other.

The two drive mechanisms constituting each pair are drivingly connected to the drive shaft 201 through different gear transmission ratios. This is evident from FIG. 18 in relation to the pair constituted by the first and second drive mechanisms 221, 222, from which it can be seen that the first drive mechanism 221 is connected to the drive shaft 201 through a train of gears involving the first driven gear 315, and the second drive mechanism 222 is connected to the drive shaft 201 through a train of gears involving the second driven gear 323. The different transmission ratios arise because of the different sizes of the first and second driven gears 315, 323. Similar arrangements apply to the other pairs of drive mechanisms, as is evident from FIGS. 18 and 19.

The power means 207 operates the various drive mechanisms 205.

The power means 207 comprises a loading means 351 common to the two drive mechanisms constituting each pair, and a spring structure 353 associated with the gear of the gear and pinion mechanism of each respective drive mechanism within the pair. This will now be described in relation to the drive mechanism pair constituted by the first and second drive mechanisms 221, 222, with specific reference to FIGS. 20, 21 and 22 of the drawings.

Figure 20:
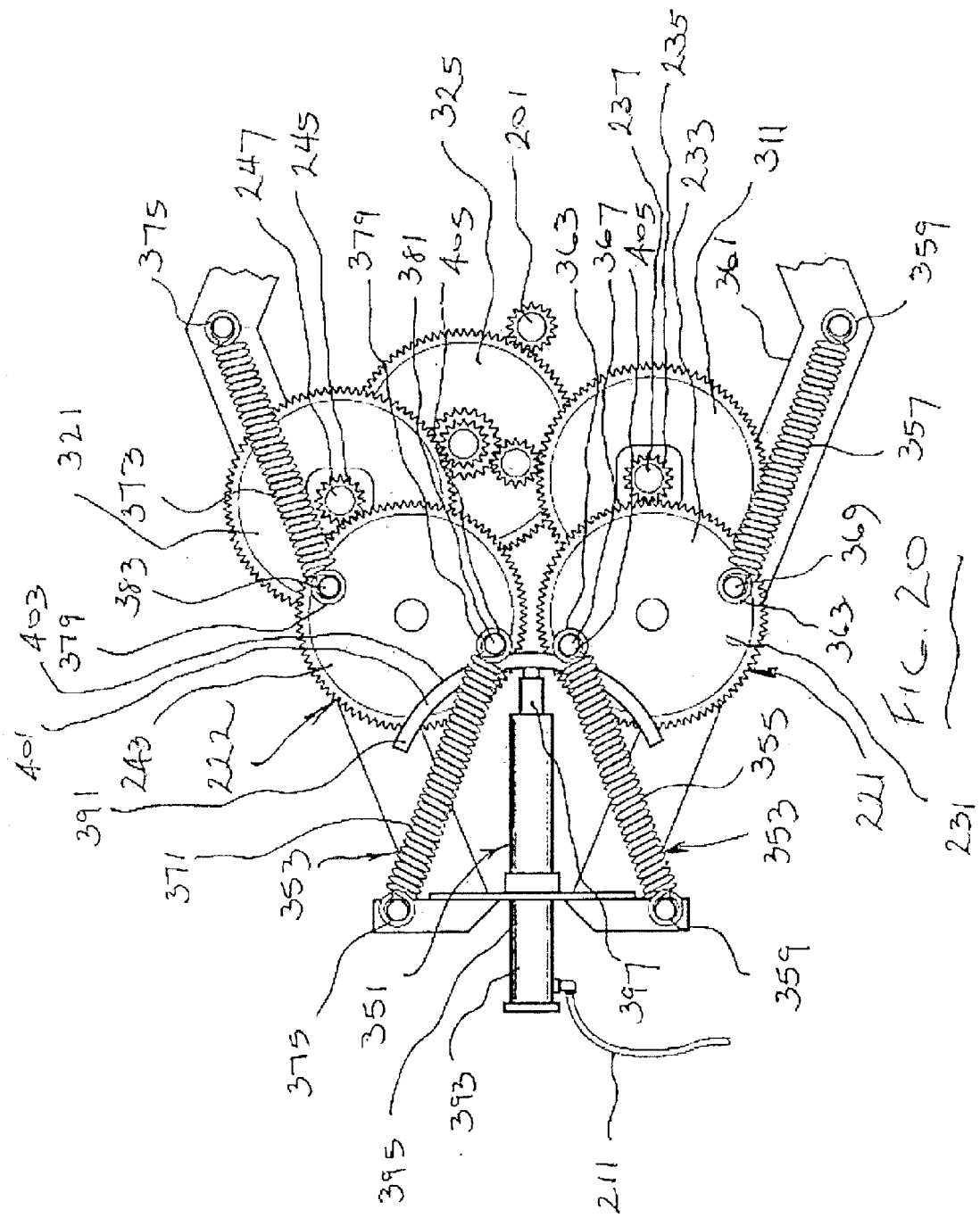

As shown in FIGS. 20, 21 and 22, the spring structure 353 associated with the first drive mechanism 221 comprises two extension springs 355, 357 each fixed at one end 359 to a frame structure 361 of the engine 200 and connected at the other end 363 to the gear 233 of the first gear and pinion mechanism 231. The ends 363 of the extension springs 355, 357 are connected to lugs 367, 369 on the gear 233 at locations offset from the rotational axis of the gear 233, whereby rotation of the gear 233 in one direction causes extension of the springs 355, 357 and the spring forces so generated urge the gear 233 to rotate in the other direction.

Similarly, the spring structure 353 associated with the second drive mechanism 222 comprises two extension springs 371, 373, each fixed at one end 375 to the frame structure 361 of the engine 200 and connected at the other end 377 to the gear 243 of the second gear and pinion mechanism 241. The ends 379 of the extension springs 371, 373 are connected to lugs 381, 383 on the gear 243 at locations offset from the rotational axis of the gear 243, whereby rotation of the gear 243 in one direction causes extension of the springs 371, 373 and the spring forces so generated urge the gear 243 to rotate in the other direction.

As previously mentioned, the loading means 351 is common to the first and second drive mechanisms 221, 222. The loading means 351 is operable to cause rotation of the gears 233, 243 in their respective directions to load the spring structures 353 connected thereto.

The loading means 351 comprises a movable element 391 and a hydraulic ram 393 which is incorporated in the hydraulic circuit 211 and which is operable to move the movable element 391 to cause loading of the spring structures 353 as will be explained.

The hydraulic ram 393 has a cylinder body 395 fixed to the engine frame structure 361 and a piston 397 on which the movable element 391 is carried.

The moveable element 391 comprises a rail 401 providing a cam 403 having an arcuate cam profile.

Each gear 233, 243 has a cam follower 405 in rolling engagement with the cam 403. The cam follower 405 on gear 233 comprises a roller (not shown) supported on lug 367 on the gear. Similarly, the cam follower 405 on gear 243 comprises a roller (also not shown) supported on lug 381 on the gear.

As can be seen in the drawings, the cam profile is disposed symmetrically with respect to the line of movement of the cam 403, and the two cam followers 405 are disposed one to each side of that line of movement.

With this arrangement, extension of the hydraulic ram 393 causes linear movement of the cam 403 which in turn causes the gears 233, 243 to rotate in their respective directions corresponding to extension of the spring structures 353 connected thereto. As the cam 403 undergoes the linear movement, the cam followers 405 travel along the arcuate cam profile and in so doing cause the gears 233, 243 to rotate as described. In this embodiment, a stroke length of about 240 mm for the hydraulic ram 393 causes each cam follower 405 to travel about 450 mm along the cam profile.

Rotation of the gears 233, 243 under the influence of the loading means 351 causes the springs to load (i.e. undergo extension) as previously described. This is evident from FIGS. 20 and 21 of the drawings, in which FIG. 20 illustrates the arrangement before extension of the ram 393 and rotation of the gears 233, 243, and FIG. 21 illustrates the arrangement after full extension of the ram 393. As can be seen in FIG. 21, the gears 233, 243 have rotated an equal extent and the spring structures 353 are fully loaded.

As each gear 233, 243 is rotated under the influence of the common loading means 351 to load the respective spring structures 353, torque is not transmitted to the first and second input shafts 237, 247 as the pinions 235, 245 freewheel with respect thereto because of the clutch mechanisms 239, 249.

The hydraulic pressure, which is supplied to the hydraulic ram 393 to cause it to move from the retracted condition of FIG. 20 to the extended condition of FIG. 21, is interrupted once the hydraulic ram 393 arrives at the extended condition thereby to remove, or at least significantly reduce, the force exerted by the ram. The gears 233, 243 are then caused to rotate in the reverse direction under the influence of the loaded spring structures 353. Each gear 233, 243 thus performs a power stroke and applies torque through its respective pinion 235, 245. The torque applied to the first pinion 235 is transmitted through the clutch mechanism 239 to the first input shaft 237, from where it is transmitted through the gear train involving the first driven gear 315 to the drive shaft 201. Similarly, the torque applied to the second pinion 245 is transmitted through the clutch mechanism 249 to the second input shaft 237, from where it is transmitted through the gear train involving the second driven gear 323 to the drive shaft.

Because of the different transmission ratios involved through their driving connection to the drive shaft 201, the first gear 231 travels at a faster rate than the second gear 241 during their power strokes. This is evident in FIG. 22 which illustrates the gears 231, 241 undergoing their power strokes and from which it can be seen that the first gear 231 has travelled further than the second gear 241. Because the first gear 231 travels at the faster rate, it acts on the movable element 391 and thereby causes the hydraulic ram 393 to retract. As can be seen from FIG. 22, the second gear 241 does not remain in contact with the moveable element 391 throughout its power stroke owing to the slower rate at which it travels.

The first and second drive mechanisms 221, 222 commence their respective power strokes at the same time. Both drive mechanisms 221, 222 initially apply torque to the drive shaft 201. Because the second drive mechanism 222 operates at a slower rate than the first drive mechanism 222, it continues to apply torque to the output shaft 201 for a limited time after completion of the power stroke of the first drive mechanism 221.

Once the second drive mechanism 222 has also completed its power stroke, the loading means 351 again operates to rotate the gears 233, 243 in unison and thereby again load the spring structures 353 so that the cycle can be repeated.

The hydraulic ram 393 is controlled in its movement by a control system incorporating limit switches (not shown) which detect the presence of the ram 393 at its fully retracted and fully extended conditions.

The other drive mechanism pairs operate in a similar fashion to apply torque to the drive shaft 201. The various drive mechanism pairs operate in a timed sequence. In this embodiment, the drive mechanism pair constituted by the first and second drive mechanisms 221, 222 operate in unison with the drive mechanism pair constituted by the fifth and sixth drive mechanisms 225, 226. Similarly, the drive mechanism pair constituted by the third and fourth drive mechanisms 223, 224 operate in unison with the drive mechanism pair constituted by the seventh and eighth drive mechanisms 227, 228.

The timed sequence of operation of the various drive mechanism pairs ensures that rotational torque is applied to the drive shaft 201 substantially constantly throughout operation of the engine 200.

With the engine according to this embodiment, each spring structure has a loading time of about 2 to 3 seconds and this provides an output at the drive shaft for a duration of about 150 seconds at a speed of about 400 rpm.

The particular configuration of the loading means 351 for each drive mechanism pair, together with the use of a gear and pinion mechanism as the drive mechanism, provides an arrangement which is conducive to compact construction while enabling the spring structures 353 to be loaded rapidly.

Improvements and modifications may be incorporated without departing from the scope of the invention.

It should be appreciated that the invention is not limited to an engine for driving an electro-dynamic machine. The engine may be used to drive any appropriate load.

Throughout the specification, unless the context requires otherwise, the word "comprise" or variations such as "comprises" or "comprising", will be understood to imply the inclusion of a stated integer or group of integers but not the exclusion of any other integer or group of integers.

What is claimed is:

1. A machine comprising:
   a drive shaft;
   a first gear train and a second gear train both drivingly connected to the drive shaft;
   the first gear train having a first input shaft;
   the second gear train having a second input shaft;
   a first drive mechanism drivingly connected to the first input shaft;
   a second drive mechanism drivingly connected to the second input shaft; and
   a power means for operating the first and second drive mechanisms to sequentially move through power and return strokes whereby upon each power stroke the drive mechanisms respectively apply torque to the first and second input shafts.

2. A machine according to claim 1 wherein the sequence in which torque is applied to the first and second input shafts is such that torque is initially delivered to both the first and second input shafts and subsequently to only one of the input shafts.

3. A machine according to claim 2 wherein one drive mechanism is arranged completing its power stroke after completion of the power stroke by the other drive mechanism.

4. A machine according to claim 3 wherein said one drive mechanism is adapted to complete about one-half of its power stroke at the stage where the other completes its power stroke.

5. A machine according to claim 1 wherein the first and second gear trains share some common gears.

6. A machine according to claim 1 wherein the first drive means comprises a first rack and pinion mechanism with the pinion thereof drivingly connected to the first input shaft.

7. A machine according to claim 6 wherein the second drive mechanism comprises a second rack and pinion mechanism with the pinion thereof drivingly connected to the second input shaft.

8. A machine according to claim 6 wherein the power means comprises a spring structure associated with the rack of each rack and pinion mechanism and loading means for loading the spring structure to generate a spring force therein, wherein the spring force is utilised to drive the rack in one direction to provide the power stroke for effecting rotation of the respective pinion.

9. A machine according to claim 7 wherein the pinions are adapted to freewheel with respect to their respective input shafts upon movement of the racks in the reverse direction.

10. A machine according to claim 7 wherein the first and second racks undergo their return strokes in unison.

11. A machine according to claim 8 wherein the spring structure comprises a helical tension spring.

12. A machine according to claim 8 wherein the loading means for loading the spring structure comprises a power mechanism including a telescopic ram, whereby operation or the ram effects rapid loading of the spring structure.

13. A machine according to claim 12 wherein the telescopic ram comprises a hydraulic ram incorporated in a hydraulic circuit which further includes a hydraulic pump driven by an electric motor.

14. A machine according to claim 13 wherein the electric motor is powered from an electrical supply generated by an electrodynamic machine driven by the engine.

15. A machine according to claim 1 further comprising:
   a third gear train and a fourth gear train both drivingly connected to the drive shaft;
   the third gear train having a third input shaft;
   the fourth gear train having a fourth input shaft;
   a third drive mechanism drivingly connected to the third input shaft;
   a fourth drive mechanism drivingly connected to the fourth input shaft, wherein the power means drives the third and fourth drive mechanisms to sequentially move the third and fourth through power and return strokes whereby upon each power stroke the third and fourth drive mechanisms apply torque to the third and fourth input shafts.

16. A machine according to claim 15 wherein the various drive mechanisms are adapted to operate in a sequence in which torque is applied to the various input shafts is such that torque is initially delivered to both the first and second input shafts and subsequently to only first input shaft during which stage torque is initially delivered to both the third and fourth input shafts and subsequently to only the third input shaft during which stage torque is initially delivered to both the first and second input shafts and subsequently to only the first input shaft.

17. A machine according to claim 1 wherein each drive mechanism comprises a gear and pinion mechanism.

18. A machine according to claim 17 wherein the power means comprises a spring structure associated with each gear and a loading means for loading the spring structure to generate a spring force therein.

19. A machine according to claim 18 wherein the loading means is common to both the first and second drive mechanisms.

20. A machine according to claim 19 wherein the spring structure comprises at least one axial spring each having one end attached to the respective gear and the other end fixed, whereby rotation of the gear in one direction corresponds to extension of the spring and rotation of the gear in the other direction corresponds to contraction of the spring.

21. A machine according to claim 20 wherein each spring is an extension spring and rotation of the gear in one direction causes extension of the spring to effect loading thereof such that the spring force so generated subsequently effects reverse rotation of the gear upon contraction of the spring, whereby the drive mechanism performs a loading (return) stroke upon rotation of the gear in the direction corresponding to loading of the spring and a power stroke when moving in the reverse direction under the influence of the spring.

22. A machine according to claim 19 wherein the loading means comprises a movable element operably connected to the gears of the two gear and pinion mechanisms whereby linear movement of the moveable element in one direction causes rotation of the gears and thus loading of the respective springs connected thereto.

23. A machine according to claim 22 wherein the movable element provides a cam having an arcuate cam profile, and each gear has a crank element engagable with the cam profile for movement therealong upon linear movement of the movable element in said one direction.

24. A machine according to claim 23 wherein the loading means further comprises a power mechanism for effecting linear movement of the movable element in said one direction.

25. A machine according to claim 17 wherein the first drive mechanism is drivingly connected to the drive shaft by way of the first gear train, and the second drive mechanism is drivingly connected to the drive shaft by way of the second gear train, the first and second gear trains sharing some common gears, the pinion of each gear and pinion mechanism being adapted to freewheel as its respective gear undergoes a loading (return) stroke, and wherein the transmission ratio between the first drive mechanism and the drive shaft is different from the transmission ratio between the second drive mechanism and the drive shaft.

26. A machine comprising:
a drive shaft;
a first gear train and a second gear train both drivingly connected to the drive shaft;
the first gear train having a first input shaft;
the second gear train having a second input shaft;
a first drive mechanism drivingly connected to the first input shaft;
a second drive mechanism drivingly connected to the second input shaft;
each drive mechanism comprising a gear and pinion mechanism;
a power means for operating the first and second drive mechanisms to sequentially move through power and return strokes whereby upon each power stroke the drive mechanisms respectively apply torque to the first and second input shafts; and
the power means comprising a spring structure associated with the gear of each gear and pinion mechanism, and a loading means common to both drive mechanisms for loading the spring structures to generate spring forces therein.

27. A machine according to claim 26 wherein the sequence in which torque is applied to the first and second input shafts is such that torque is initially delivered to both input shafts and subsequently to only one of the input shafts.

28. A machine according to claim 27 wherein one drive mechanism is arranged to complete its power stroke after completion of the power stroke by the other drive mechanism.

29. A machine according to claim 28 wherein the power means comprises a spring structure associated with each gear and a loading means for loading the spring structure to generate a spring force therein.

30. A machine according to claim 29 wherein the loading means is common to both the first and second drive mechanisms.

31. A machine according to claim 30 wherein the spring structure comprises at least one axial spring each having one end attached to the respective gear and the other end fixed, whereby rotation of the gear in one direction corresponds to extension of the spring and rotation of the gear in the other direction corresponds to contraction of the spring.

32. A machine according to claim 31 wherein each spring is an extension spring and rotation of the gear in one direction causes extension of the spring to effect loading thereof such that the spring force so generated subsequently effects reverse rotation of the gear upon contraction of the spring, whereby the drive mechanism performs a loading (return) stroke upon rotation of the gear in the direction corresponding to loading of the spring and a power stroke when moving in the reverse direction under the influence of the spring.

33. A machine according to claim 29 wherein the loading means comprise a movable element operably connected to the gears of the two gear and pinion mechanisms whereby linear movement of the removable element in one direction causes rotation of the gears and thus loading of the respective springs connected thereto.

34. A machine according to claim 33 wherein the movable element provides a cam having an arcuate cam profile, and each gear has a crank element engagable with the cam profile for movement therealong upon linear movement of the movable element in said one direction.

35. A machine according to claim 34 wherein the loading means further comprises a power mechanism for effecting linear movement of the movable element in said one direction.

36. A machine according to claim 26 wherein the first drive mechanism is drivingly connected to the drive shaft by way of the first gear train, and the second drive mechanism is drivingly connected to the drive shaft by way of the second gear train, the first and second gear trains sharing some common gears, the pinion of each gear and pinion mechanism being adapted to freewheel as its respective gear undergoes a loading (return) stroke, and wherein the transmission ratio between the first drive mechanism and the drive shaft is different from the transmission ratio between the second drive mechanism and the drive shaft.

37. A machine comprising a drive shaft, and first, second, third and fourth drive mechanisms drivingly connected to the drive shaft for applying rotational torque thereto during power strokes of the drive mechanisms, the drive mechanisms being operable to perform their respective power strokes in a cycle whereby the first and second drive mechanisms operate together during part of their power strokes and thereafter one of the first and second drive mechanisms completes its power stroke while the other of the first and second drive mechanisms continues its power stroke during which stage the third and fourth drive mechanisms operate together during part of their power strokes and thereafter one of the third and fourth drive mechanisms completes its power stroke while the other of the third and fourth drive mechanisms continues its power stroke during which stage the first and second drive mechanisms operate together during part of their power strokes to repeal the cycle.

38. A method of operating a machine having a drive shaft, and first and second drive mechanisms operatively connected to the drive shaft for applying rotational torque thereto during power strokes of the drive mechanism, the method comprising the steps of operating the machine in an operating cycle in which both drive mechanisms operate together during part of their power strokes and thereafter one drive mechanism completes its power stroke while the other drive mechanism continues its power stroke, and following completion of the power stroke of said other drive mechanism both drive mechanisms operate together during part of their power strokes to repeat the cycle.

39. A method of operating a machine having a drive shaft, and first, second, third and fourth drive mechanisms operatively connected to the drive shaft for applying rotational torque thereto during power strokes of the drive mechanisms, the method comprising the steps of operating the machine in an operating cycle in which the first and second drive mechanisms operate together during part of their power strokes and thereafter one of the first and second drive mechanisms completes its power stroke while the other of the first and second drive mechanisms continues its power stroke during which stage the third and fourth drive mechanisms operate together during part of their power strokes and thereafter one of the fourth and fifth drive mechanisms completes its power stroke while the other of the fourth and the fifth drive mechanisms continues its power stroke during which stage the first and second drive mechanisms operate together during part of their power strokes to repeat the cycle.

* * * * *